US011956518B2

(12) United States Patent
Fairbanks

(10) Patent No.: US 11,956,518 B2
(45) Date of Patent: Apr. 9, 2024

(54) SYSTEM AND METHOD FOR CREATING INTERACTIVE ELEMENTS FOR OBJECTS CONTEMPORANEOUSLY DISPLAYED IN LIVE VIDEO

(71) Applicant: Clicktivated Video, Inc., Birmingham, MI (US)

(72) Inventor: Neal C. Fairbanks, Livonia, MI (US)

(73) Assignee: Clicktivated Video, Inc., Birmingham, MI (US)

(*) Notice: Subject to any disclaimer, the term of this patent is extended or adjusted under 35 U.S.C. 154(b) by 0 days.

(21) Appl. No.: 17/533,288

(22) Filed: Nov. 23, 2021

(65) Prior Publication Data

US 2022/0167067 A1 May 26, 2022

Related U.S. Application Data

(60) Provisional application No. 63/117,157, filed on Nov. 23, 2020.

(51) Int. Cl.
*H04N 21/854* (2011.01)
*H04N 21/2187* (2011.01)
(Continued)

(52) U.S. Cl.
CPC ..... *H04N 21/8545* (2013.01); *H04N 21/2187* (2013.01); *H04N 21/2353* (2013.01); *H04N 21/84* (2013.01)

(58) Field of Classification Search
None
See application file for complete search history.

(56) References Cited

U.S. PATENT DOCUMENTS

| 5,561,708 A | 10/1996 | Remillard |
| 5,708,845 A | 1/1998 | Wistendahl et al. |

(Continued)

FOREIGN PATENT DOCUMENTS

| WO | 2012045317 A1 | 4/2012 |
| WO | 2017011084 A1 | 1/2017 |

OTHER PUBLICATIONS

Hypervideo meets product placement: a study of product placement and its recall and recognition effects in interactive digital music video, DCU, Artemisa Jaramillo, 2017.

(Continued)

*Primary Examiner* — Jefferey F Harold
*Assistant Examiner* — Charles N Hicks
(74) *Attorney, Agent, or Firm* — Jacob M. Ward; Ward Law Office LLC

(57) ABSTRACT

A system and a method are disclosed for providing additional information associated with an object visually present in live media content. Live media content is acquired with a video capture system and displayed in an injection tool having a display and a grid dividing the display into a plurality of zones. The subject invention defines object images for any object that may be visually present in the live media, selects one or more of the zones where the object is visually present and associates the selected zones and the object image. An object injection time is defined and a live element parameter is defined as including the object injection time, the selected zones and the object image. Next, a package update is created that includes the live element parameter and the package update is delivered to the viewer device and the initial portable package is updated with the live element parameter. A selection event is received and object metadata is retrieved such that additional information is displayable to the viewer on the viewer device.

16 Claims, 15 Drawing Sheets

(51) Int. Cl.
*H04N 21/235* (2011.01)
*H04N 21/84* (2011.01)
*H04N 21/8545* (2011.01)

(56) References Cited

U.S. PATENT DOCUMENTS

| | | | |
|---|---|---|---|
| 6,002,394 A | 12/1999 | Schein et al. | |
| 6,496,981 B1 | 12/2002 | Wistendahl et al. | |
| 6,636,237 B1 | 10/2003 | Murray et al. | |
| 6,675,174 B1 | 1/2004 | Bolle et al. | |
| 7,325,013 B2 | 1/2008 | Caruso | |
| 7,653,921 B2 | 1/2010 | Herley | |
| 7,769,708 B2 | 8/2010 | Caruso | |
| 7,809,154 B2 | 10/2010 | Lienhart et al. | |
| 7,870,592 B2 | 1/2011 | Hudson et al. | |
| 7,895,325 B2 | 2/2011 | Van Vleet et al. | |
| 7,962,367 B1 | 6/2011 | Fuisz et al. | |
| 8,065,615 B2 | 11/2011 | Murray et al. | |
| 8,073,194 B2 | 12/2011 | Lienhart et al. | |
| 8,090,579 B2 | 1/2012 | DeBusk et al. | |
| 8,255,279 B2 | 8/2012 | Fuisz et al. | |
| 8,312,486 B1 | 11/2012 | Briggs et al. | |
| 8,392,821 B2 | 3/2013 | DeMarco et al. | |
| 8,418,198 B2 | 4/2013 | Cansler et al. | |
| 8,533,753 B2 | 9/2013 | Briggs et al. | |
| 8,549,555 B2 | 10/2013 | Briggs et al. | |
| 8,782,690 B2 | 7/2014 | Briggs et al. | |
| 8,843,959 B2 | 9/2014 | McMaster et al. | |
| 8,850,477 B2 | 9/2014 | Schein et al. | |
| 8,893,173 B2 | 11/2014 | Briggs et al. | |
| 9,189,818 B2 | 11/2015 | McClements, IV | |
| 9,247,309 B2 | 1/2016 | Oztaskent et al. | |
| 9,258,597 B1 | 2/2016 | Clayton | |
| 9,516,251 B2 | 12/2016 | Welch | |
| 9,560,415 B2 | 1/2017 | Good et al. | |
| 9,596,515 B2 | 3/2017 | Witenstein-Weaver | |
| 9,639,532 B2 | 5/2017 | Raichelgauz et al. | |
| 9,705,728 B2 | 7/2017 | Bridges | |
| 9,883,249 B2 | 1/2018 | Taylor et al. | |
| 9,888,289 B2 | 2/2018 | Gross | |
| 9,936,238 B2 | 4/2018 | Grubbs et al. | |
| 9,973,819 B1 | 5/2018 | Taylor et al. | |
| 10,021,458 B1 | 7/2018 | Taylor et al. | |
| 10,397,666 B2 | 8/2019 | Thomas et al. | |
| 10,477,287 B1 | 11/2019 | Fairbanks | |
| 10,659,519 B2 | 5/2020 | Rhyu et al. | |
| 10,674,185 B2 | 6/2020 | Thomas et al. | |
| 10,820,062 B2 | 10/2020 | Chandler et al. | |
| 2002/0059117 A1 | 5/2002 | Yoch et al. | |
| 2003/0149983 A1 | 8/2003 | Markel | |
| 2004/0109087 A1 | 6/2004 | Robinson et al. | |
| 2005/0069225 A1 | 3/2005 | Schneider et al. | |
| 2005/0137958 A1 | 6/2005 | Huber et al. | |
| 2007/0124762 A1 | 5/2007 | Chickering et al. | |
| 2008/0052750 A1 | 2/2008 | Grunnet-Jepsen et al. | |
| 2008/0066136 A1 | 3/2008 | Dorai et al. | |
| 2008/0126191 A1 | 5/2008 | Schiavi | |
| 2008/0140523 A1 | 6/2008 | Mahoney et al. | |
| 2009/0271819 A1 | 10/2009 | Cansler et al. | |
| 2009/0276805 A1 | 11/2009 | Andrews, II et al. | |
| 2011/0035382 A1 | 2/2011 | Bauer et al. | |
| 2011/0052144 A1 | 3/2011 | Abbas et al. | |
| 2011/0191699 A1 | 8/2011 | Cunningham et al. | |
| 2012/0151347 A1 | 6/2012 | McClements, IV | |
| 2012/0167145 A1 | 6/2012 | Incorvia | |
| 2012/0167146 A1* | 6/2012 | Incorvia | H04N 21/234318 725/60 |
| 2012/0183229 A1* | 7/2012 | McDevitt | H04N 21/23614 382/218 |
| 2012/0206647 A1 | 8/2012 | Allsbrook et al. | |
| 2013/0074139 A1 | 3/2013 | Cope et al. | |
| 2013/0174195 A1 | 7/2013 | Witenstein-Weaver | |
| 2014/0047483 A1 | 2/2014 | Fairbanks | |
| 2014/0255003 A1 | 9/2014 | Abramson | |
| 2014/0259056 A1* | 9/2014 | Grusd | H04N 21/4725 725/34 |
| 2015/0121439 A1* | 4/2015 | Wellen | H04N 21/858 725/109 |
| 2015/0177940 A1 | 6/2015 | Trevino et al. | |
| 2015/0245079 A1* | 8/2015 | Tremblay | H04H 20/38 725/116 |
| 2016/0381427 A1* | 12/2016 | Taylor | H04N 21/472 725/13 |
| 2017/0017382 A1 | 1/2017 | Tobin et al. | |
| 2018/0288496 A1* | 10/2018 | Ade | G06F 40/109 |
| 2019/0246158 A1* | 8/2019 | Martell | H04N 21/8456 |
| 2019/0253761 A1* | 8/2019 | Yusupov | H04N 21/41407 |
| 2022/0053233 A1* | 2/2022 | Baxter | H04N 21/8173 |

OTHER PUBLICATIONS

A System for Retargeting of Streaming Video, Kräenbuhl, Philipp, et al.

VideoTrace: Rapid interactive scene modelling from video, van den Hengel, Anton, et al., Jul. 2007.

* cited by examiner

SYSTEM AND METHOD FOR CREATING INTERACTIVE ELEMENTS FOR OBJECTS CONTEMPORANEOUSLY DISPLAYED IN LIVE VIDEO

BACKGROUND OF THE INVENTION

Field of the Invention

The subject invention relates to a system and a method for creating interactive elements associated with objects contemporaneously with acquiring live video content.

BRIEF SUMMARY OF THE INVENTION

The subject invention provides, in one embodiment, a method for providing additional information associated with an object visually present in live media content when interacted with by a user on a viewer device. The method comprises the steps of creating an initial portable package for the live media content that includes a live media content key and distributing the initial portable package to be retrievable by the viewer device in response to a request from the viewer device. The subject invention receives a request from the viewer device for the initial portable package and delivers the initial portable package to the viewer device based on the request. Live media content is acquired with a video capture system and displayed in an injection tool having a display as the live video is acquired. The injection tool has a grid dividing the display into a plurality of zones. The subject invention dynamically creates interactivity in one or more of the plurality of zones in response to the object being visually present within the one or more of the plurality of zones and dynamically disables the interactivity in the one or more of the plurality of zones in response to the object no longer being visually present. The step of creating the interactivity further comprises defining object images for any object that may be visually present in the live media, selecting one or more of the zones where the object is visually present and associating the selected zones and the object image. An object injection time is defined in response to associating the selected zones and the object image and a live element parameter is defined as including the object injection time, the selected zones for the object image. Next, a package update is created that includes the live element parameter and the package update is delivered to the viewer device and the initial portable package is updated with the live element parameter. A selection event is received from within a viewer on the viewer device that comprises a selection coordinate and a selection time and the portable package is parsed to determine whether the selection time corresponds to the object injection time. If the selection time corresponds with the object injection time, the portable package is further parsed to determine whether the selection coordinate is within the selected zones, if so, then object metadata is retrieved such that additional information is displayable to the viewer on the viewer device.

In one embodiment, the subject invention discloses a system and a method for creating interactive elements associated with objects contemporaneously with acquiring and transmitting live video content created during a live event. The system comprises a video capture system acquiring the live video content and an injection tool for injecting interactive elements into an initial portable package that correspond to objects appearing in the live video content. The injection tool comprises a display that shows the live video content as it is being steamed, recorded and/or transmitted as either recorded or streamed. The display includes a grid that divides the display into a predetermined number of zones. An operator of the injection tool is able to dynamically create interactive elements in the zones based on what is shown in the live video content by associating zones with objects as displayed. The injection tool creates live element parameters that includes a grid coordinate for the zone and an object injection time, which are distributed as a package update. The package update includes code representative of the live element parameters. When the object is removed, an object stop time is created and distributed as another package update. The subject invention includes a listener as part of the initial portable package. Once activated or executed on the viewer device within the player, the listener calls out to the server to check for any package updates at predetermined time intervals. The package updates are parsed and the appropriate zones are activated/deactivated based on the package update.

According to another embodiment of the subject invention, a method for providing additional information associated with an object visually present in live media content when interacted with by a user on a viewer device is disclosed. The method comprises the steps of receiving recorded media content in an authoring tool that is capable of receiving input from an author to create interactivity for objects visually present in the recorded media content. A starting point and an ending point is detected for the recorded media and a recorded clock is established based upon the starting point and the ending point. At least one interactive element is established that corresponds to an object visually present in the recorded media content. The interactive element is defined by element parameters that comprise a plurality of (X, Y) coordinates that define a shape and an object time corresponding to a duration that the shape is present at the coordinates based upon the recorded clock. Object metadata is established for the object and the object metadata is associated with the interactive element. A live media content key that associates the live media content to the recorded media content is retrieved and a portable package is created that includes the element parameters, the object metadata, the recorded clock, and the live media content key. Next, the portable package is distributed to be retrievable by the viewer device in response to a request from the viewer device and a request is received from the viewer device for the portable package and the portable package is delivered to the viewer device based on the request. The live media content key is detected in the portable package and live media content is retrieved that is associated with the live media content key within the player, wherein the live media content is being captured and transmitted in real time (streamed) and includes a live clock. The recorded clock is synchronized to the live clock so that the at least one interactive element corresponds to when the object is visually present in the live media content. A selection event is received from within a viewer on the viewer device that comprises a selection coordinate and a selection time and the portable package is parsed to determine whether the selection time corresponds to the object time. If the selection time corresponds with the object time, then further parsing of the portable package determines whether the selection coordinate is within the element parameters, and retrieving the object metadata if the selection coordinates are within the element parameters such that the additional information is displayable to the user on the viewer device.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
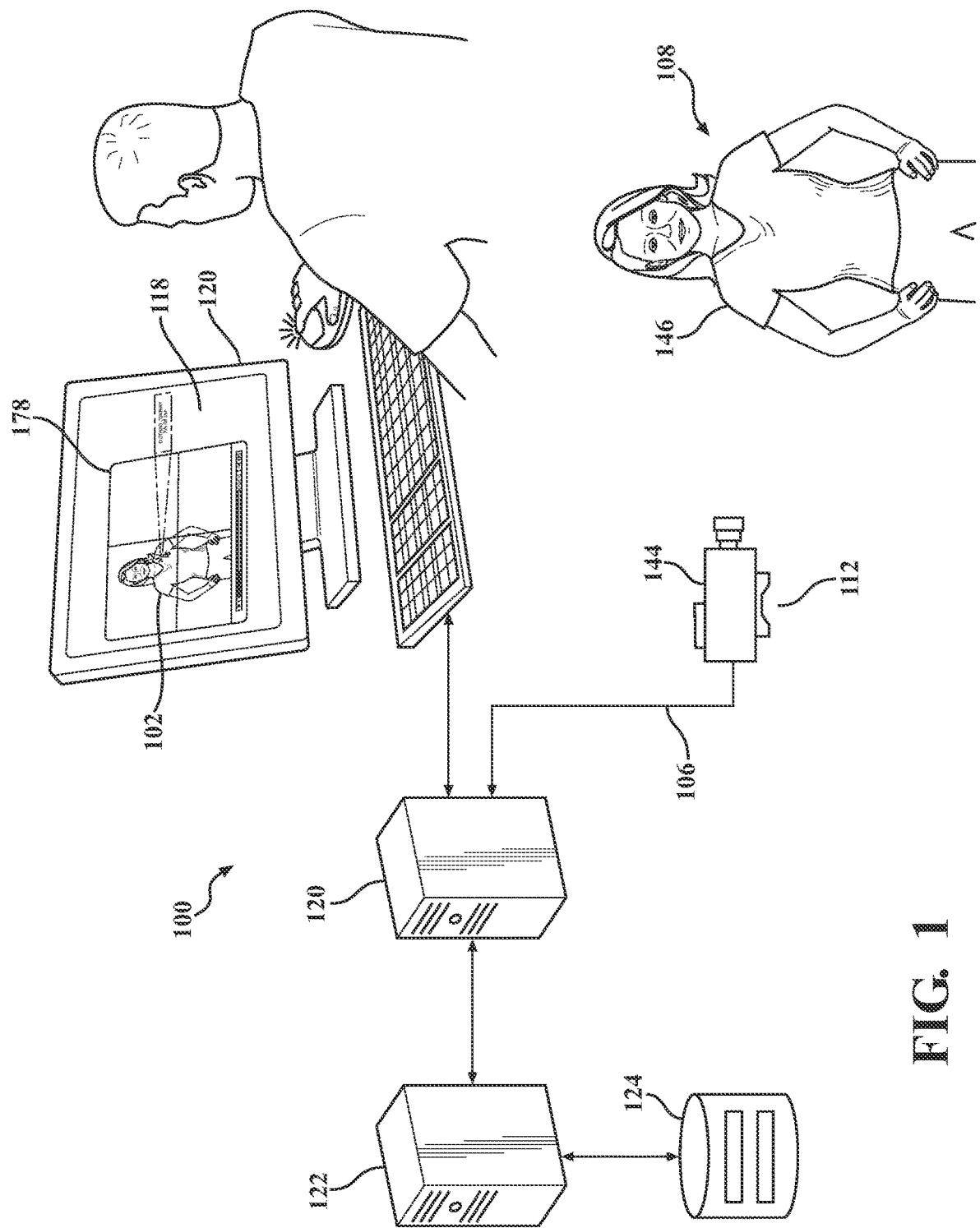
FIG. 1 is a schematic representation of one embodiment of a system for creating and distributing portable packages.

Referring to the Figures, wherein like numerals indicate corresponding parts throughout the several views, a system 100 is shown generally in FIG. 1 for creating interactive elements 102 associated with objects 104 contemporaneously with acquiring and transmitting live video content 106 created during a live event 108 is disclosed. One popular form of transmitting live video content 106 is generally referred to as streaming video, which can be done utilizing such services as facebook (meta) live, periscope, ustream, livestream, vimeo, youtube live, instagram live, wowza, brightcove, and the like. The live event 108 is broadcast or transmitted to a viewer (not shown) that is watching the live event 108 from a viewer device 110. Examples of the live events 108 include, but are not limited to, live television programs, live sporting events, news broadcasts, and live streaming videos demonstrating various products. The viewer device 110 may include smart phones, laptops or desktop computers, tablets, televisions, and the like.

The system comprises a video capture system 112 acquiring the live video content 106, an authoring tool 114 for creating an initial portable package 116, and an injection tool 118 for injecting interactive elements 102 into the initial portable package 116 that correspond to objects 104 in the live video content 106. The authoring tool 114 and the injection tool 118 may reside on a computing device 120, which may be any type of computing device 120 known to those of skill in the art. Examples of computing devices 120 could be PC, servers, tablets, or the like. Interactive elements 102, commonly referred to as "hot-spots" or "hyperlinks" are capable of being selected by the viewer and associated information is obtained or displayed once selected.

Figure 2:
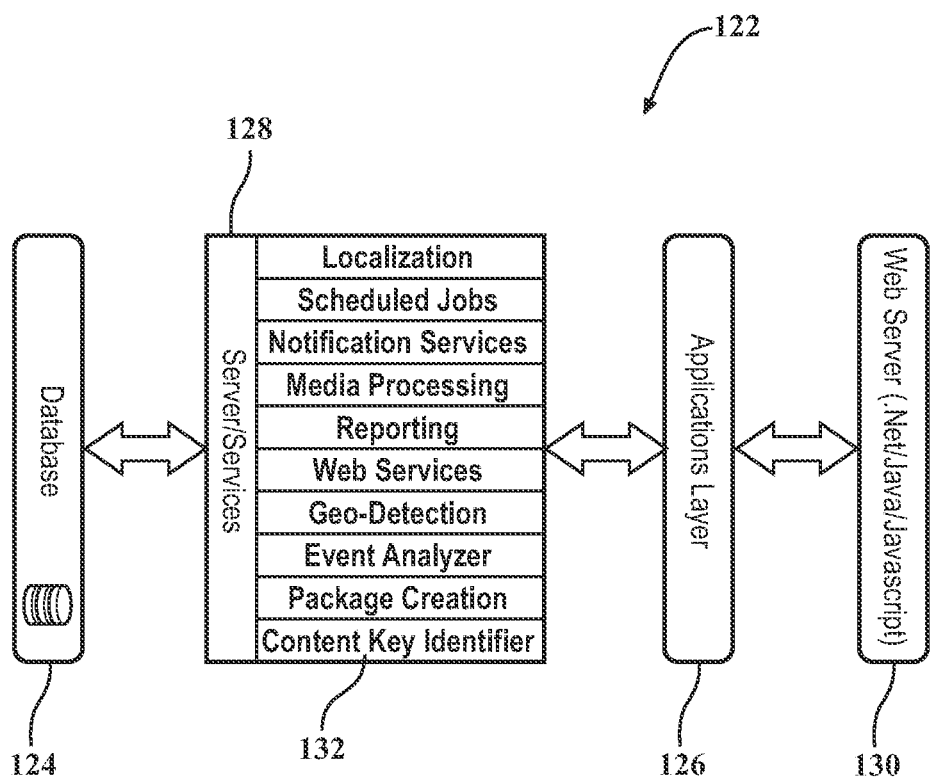
FIG. 2 is a schematic representation of layers utilized with a package server according to the subject invention.

Referring to FIG. 2, a package server 122 may include a database 124, an applications layer 126, a services layer 128, and a web server 130. The package server 122 is in communication with at least one of the authoring tool 114 and the injection tool 118. It is to be appreciated that the injection tool 118 and the authoring tool 114 may be on different computing devices 120 and connect to the package server 122 separately or remotely. The database 124 stores business rules, response rules, instructions and/or pointer data for enabling interactive and event driven content. The business and response rules may be based on the selection habits of the viewer and can provide feedback on how successful a marketing campaign was and/or what should be done next in the business. The database 124 may be comprised of multiple databases 124. The applications layer 126 and the services layer 128 may include localization, scheduled jobs, notification services, media processing, reporting, web services, geo-detection, event analyzer, package creation, and item recognition. The database 124 also stores a content key identifier 132 which defines whether the media content is live or recorded. Live events would have the content key identifier 132 represented as a live content key or and recorded events, or live events that have been recorded, are represented as a recorded content key. Recorded contend may be referred to as replayed as known to those of ordinary skill in the art. One example of a content key could be a public key such as a url addresses or public codes or a private key such as an encrypted MD5 hash value or private code.

The web server 130 is responsible for communication of events and actions between the package server 122 and viewer applications via a GUI and/or event area of the web server 130. The web server 130 may include components which may be used to communicate with one or more computing platforms and/or viewer devices remotely over a network 148.

Figure 3:
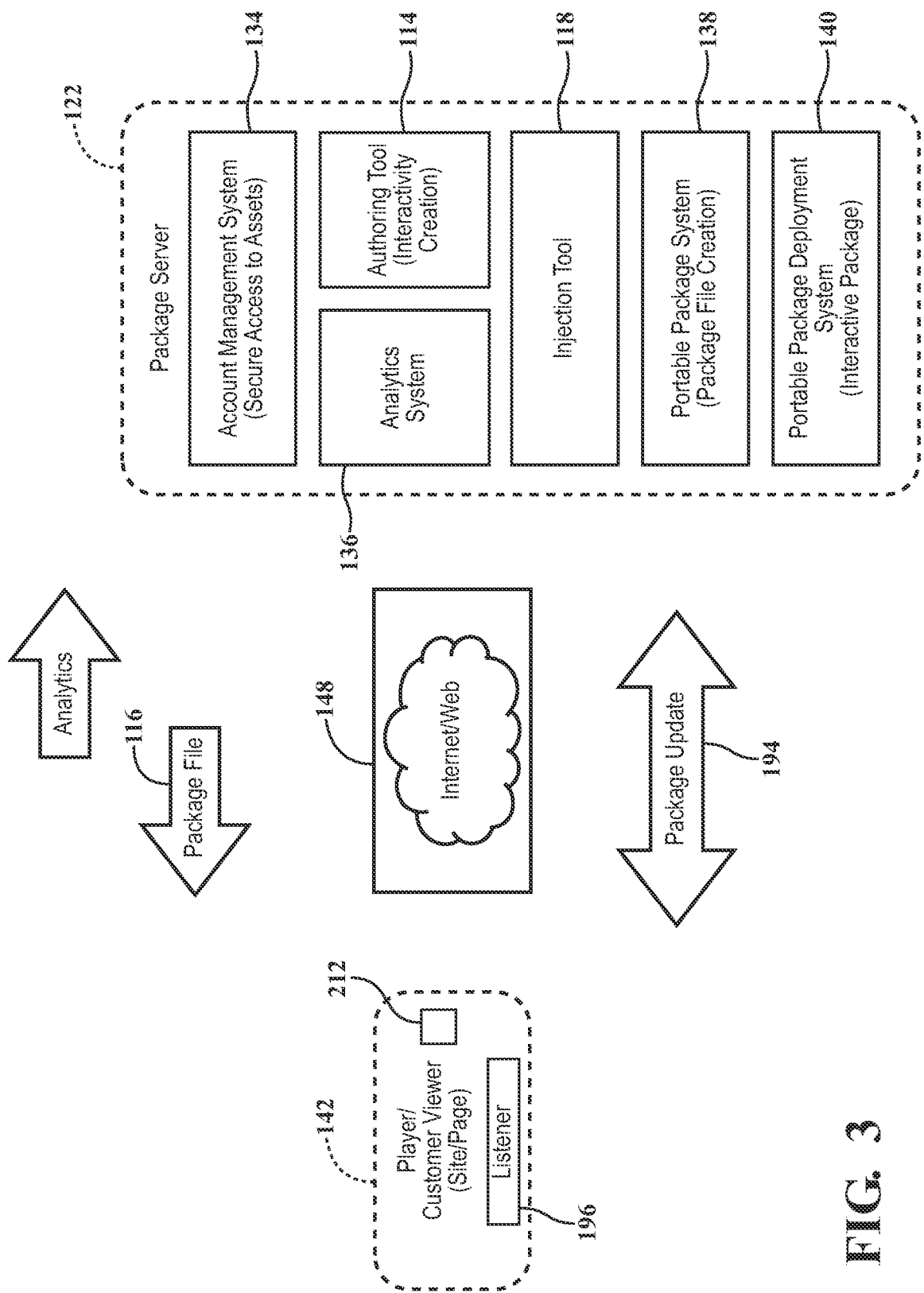
FIG. 3 is a schematic representation of another embodiment of a system for creating and distributing portable packages that provide information associated with an object present in media content to a viewer on a viewer device.

With reference to FIG. 3, in the embodiment shown, the package server 122 also includes an account management system 134, an analytics system 136, a portable package system 138, and a portable package deployment system 140. The portable package system 138 assembles the necessary components in a raw, native language, such as XML, that can be used for further processing or revising. The deployment system 140 converts the portable package into machine language and includes various different types of code that allows the portable package to work for any type of device. The portable package deployment system 140 can deploy recorded portable packages, initial portable packages, final portable packages, and package updates as described herein. It is to be appreciated that, generally, the portable packages may include similar data or information at different times and under different circumstances or the data and information could be the same depending on the source of the media content. For example, if there is only recoded media content, an initial portable package may be created and at the end of the recorded media content, the recorded portable package is created. For live media content, an initial portable package could be created, and during the actual live event, package updates are created. At the conclusion, a recorded portable package is created from the initial portable package and any package updates. This recorded portable package could be an altogether separate file from the initial portable package or simply a combination of them.

Figure 4:
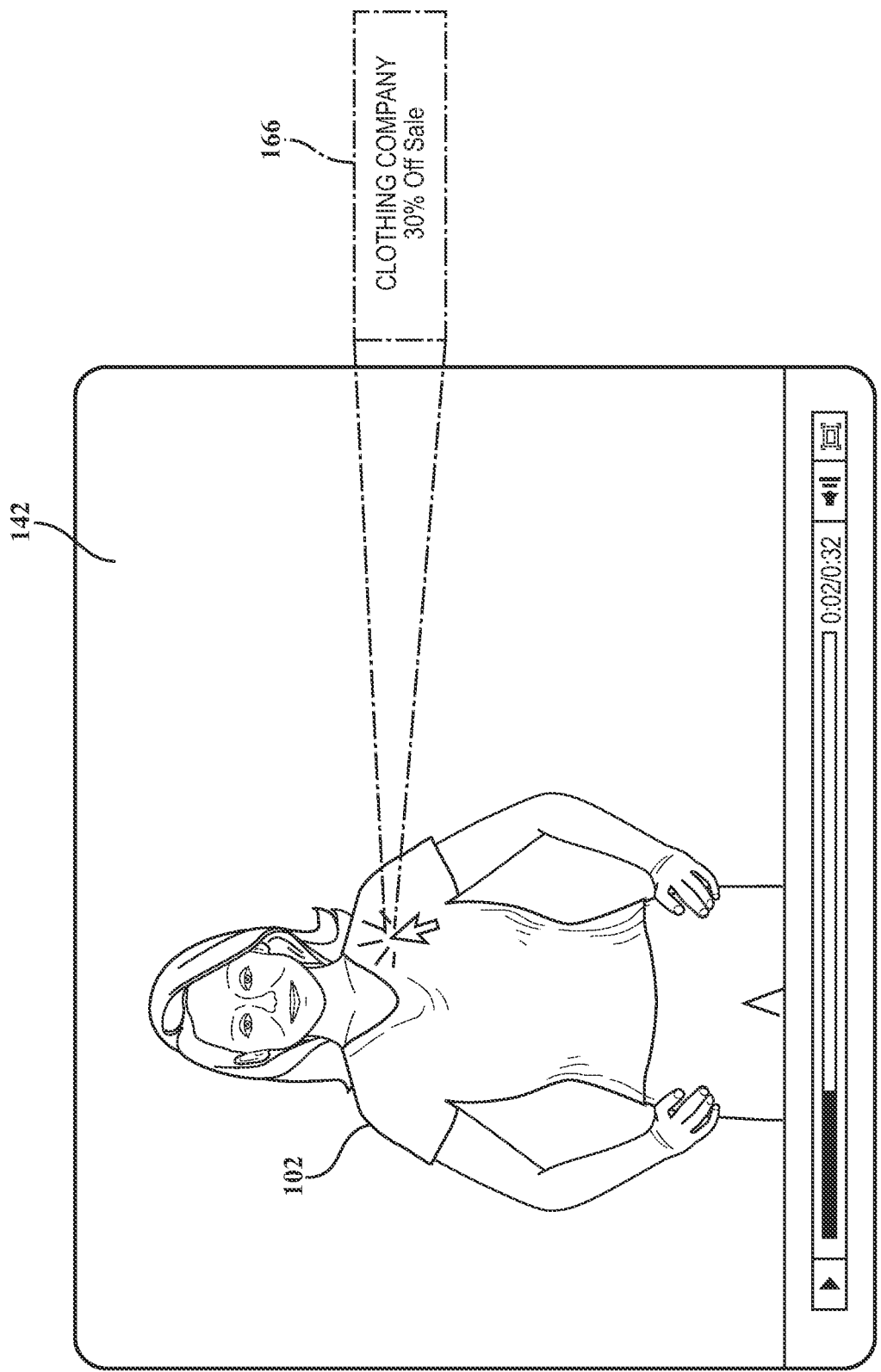
FIG. 4 is a schematic representation of a player on a viewer device.

The viewer device 110 includes a player 142, one example is shown in FIG. 4, for playing the live video content 106. The player 142 may be integrated into the viewer device 110 for playing the live video content 106 such that the media content is viewable to the viewer. Examples of the player 142 include, but are not limited to, Adobe Flash Player or Windows Media Player, and the like. The media content may be viewed by the viewer on a visual display, such as a screen or monitor, which may be connected or integrated with the viewer device 110. The player 142 may also be embedded into various websites as opposed to being a standalone player 142 as well known to those of ordinary skill in the art using various application programming interfaces that defines interactions between multiple software intermediaries and defines calls or requests that can be made, how to make them, the data formats that should be used, the conventions to follow, etc.

Referring back to FIG. 1, the video capture system 112 includes a camera 144 for capturing an actor 146 or talent in the live event 108 to create the live video content 106. The live video content 106 may be streamed such that the live video content 106 is continuously received by and presented to the viewer while being continuously delivered. The live video content 106 may be transmitted in digital form. Alternatively, the live video content 106 may be transmitted in analog form and subsequently digitized.

Figure 5:
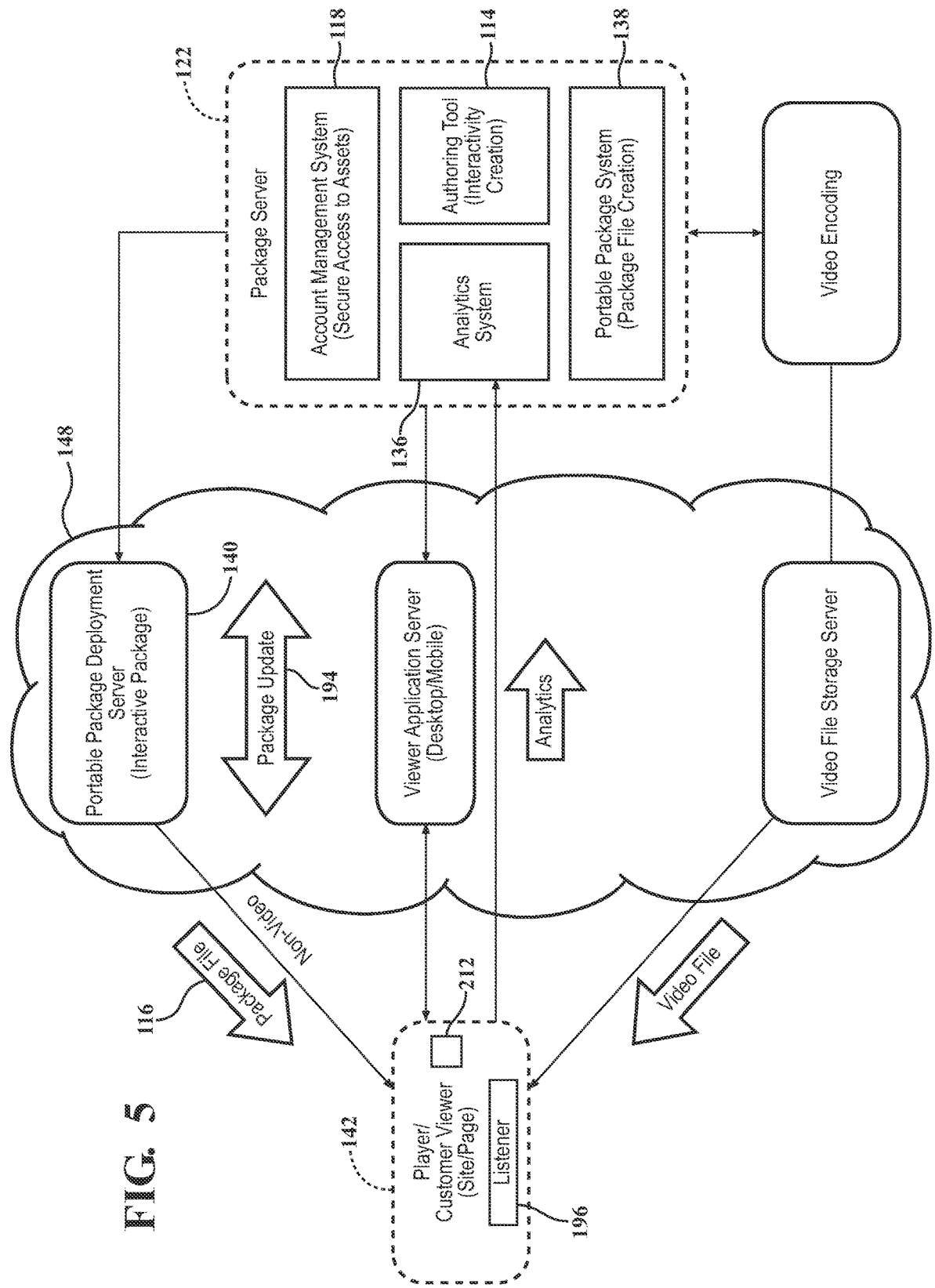
FIG. 5 is a schematic representation of yet another embodiment of a system for creating and distributing portable packages that provide information associated with an object present in media content to a viewer on a viewer device.

As shown in FIGS. 3 and 5, the live video content 106 is transmitted over a network 148 using various live streaming platforms, such as youtube, vimeo, twitch or the like. Transmission of the live video content 106 may be accomplished by satellite, network, internet, or the like. In one example, the live video content 106 is provided to the viewer through the web server 130. Alternatively, the live video content 106 is provided through third party systems. The actor 146 displays objects 104 during the live video content 106 and/or the objects 104 may be static in the live video content 106, such as objects 104 surrounding the actor 146. The object 104 may be defined as any logical item in the live video content 106 that is identifiable by the viewer. The object 104 may be the talent, a personal item, a food item, a corporate logo, a location, furniture or a vehicle, or whatever is displayed during the live event 108.

Initially, prior to capturing and transmitting the live video content 106, the system, through the authoring tool 114, may create the initial portable package 116. Minimally, the initial portable package 116 includes an initial shape file and any assets 152 for the objects 104 that may be displayed. The initial portable package 116 also includes the content key identifier 132 as a live content key 154 that indicates it is associated with the live event 108. The content key identifier 132 may be a recorded content key that is associated with live event 108 that has been completed, and is now retrievable as recorded media content, or recorded media content that was not streamed or transmitted as a live event initially. Thus, any recorded video content may not be present in the initial portable package 116 and the initial portable package 116 may be replaced at the conclusion of the live event with the recorded portable package.

The authoring tool 114 is typically a software program that is operating on an editing device, such as a computer, desktop or laptop, or tablet or the like. The editing device may be in communication with the transmitting system and video capture system, if necessary. The database 124 may be in communication with the editing device and the injection tool 118.

If recorded video content exists in advance of the live event 108, such as through rehearsal or practices sessions, the initial shape file may include recorded element parameters. In other words, the live event 108 was rehearsed and recorded element parameters were created during the rehearsal to populate the initial shape file to provide a starting point for the live event. The recorded element parameters may comprise a plurality of (X, Y) coordinates 162 that define a shape 164 and an object time 166 corresponding to a duration that the shape 164 is present at those coordinates 162. The object time 166 corresponds to a start/end time for the interactive element. The object time 166 can be created by the authoring tool 114 based on starting and stopping of the recorded video content or manually entered into the authoring tool 114 by an author. The object time 166 may be a particular point in time or a duration of time. For example, the authoring tool 114 may record a start time and an end time that the shape 164 is drawn in relation to the object 104. There may be multiple object times 166 associated with the object 104 such that the object 104 is visible at a plurality of different points in time or a plurality of different durations of time. If there are no recorded element parameters known before the live video content 106 is created, the shape file may not include any recorded element parameters and only includes the necessary information to be parsed. Alternatively, the initial shape file may be empty and will be populated while the live video content 106 is being transmitted, as discussed further below.

As an example of creating the interactive elements 102 from the recorded video content, a (0,0) origin is established whereby the authoring tool 114 can measure each (X, Y) point (vertex) and the relative distance from the origin. As one example, the origin may be located in the upper left hand corner of the authoring tool 114. However, it is to be appreciated that the origin may be any consistent location. The consistent starting origin and the (X, Y) coordinate information for points are used to scale shape coordinates 162 and to adapt to different display conditions specified by the customer viewer as set for in U.S. Pat. No. 10,477,287, which is incorporated herein by reference. It is to be appreciated that the interactive elements 102 could be established using further embodiments of the subject invention described below.

The initial portable package 116 may also include other assets 152 that are necessary to create the interactivity when objects 104 are selected by the viewer. These assets 152 may be saved as part of the initial portable package 116 and accessed when the object 104 is selected by the viewer. In one aspect of the subject invention, any necessary assets 152 for objects 104 that are displayed during the live event 108 could be created and upload during the live event 108. In order to reduce the amount of data that needs to be uploaded during the live event 108, it is preferable to preload as many of the assets 152 as possible, if known prior to the live event 108.

The assets 152 include object metadata 168 that is established for the object 104 and associated with the interactive element 102. Illustrative examples of object metadata 168 may include links for purchasing or reviewing additional information about the object 104. A landing URL 170 may be input as object metadata 168 to be available in response to triggering the interactive element. This additional information may include advertising information, such as brand awareness and/or product placement-type advertising and may be commercially related to the object 104. A description of the additional information or object 104 may also be defined. The description provides the viewer of the media content with written information related to the additional information once the viewer selects the object 104. For example, the description may be a brief message explaining the object 104 or a promotion related to the object 104.

Other assets 152 include an image, logo, or icon related to the additional information may be defined. The viewer of the media content may be presented with the image related to the additional information once the object 104 is selected by the viewer. As discussed above, the image, logo, or icon may be included as part of the initial portable package 116 or added during the live event 108. The subject invention provides that for live events 108, the initial portable package 116 does not require any interactivity to be pre-defined.

To the extent that recorded video content exists for the expected live event 108, at the designated time in the recorded video content, the above creation process is repeated. As an example, the recorded video content is then advanced forward, i.e., played or fast-forwarded, to determine if the object 104 moves or is removed or if new objects 104 are present. In such instances, the recorded element parameters may be re-established in response to changes to the object 104 in the recorded video content.

Figure 6:
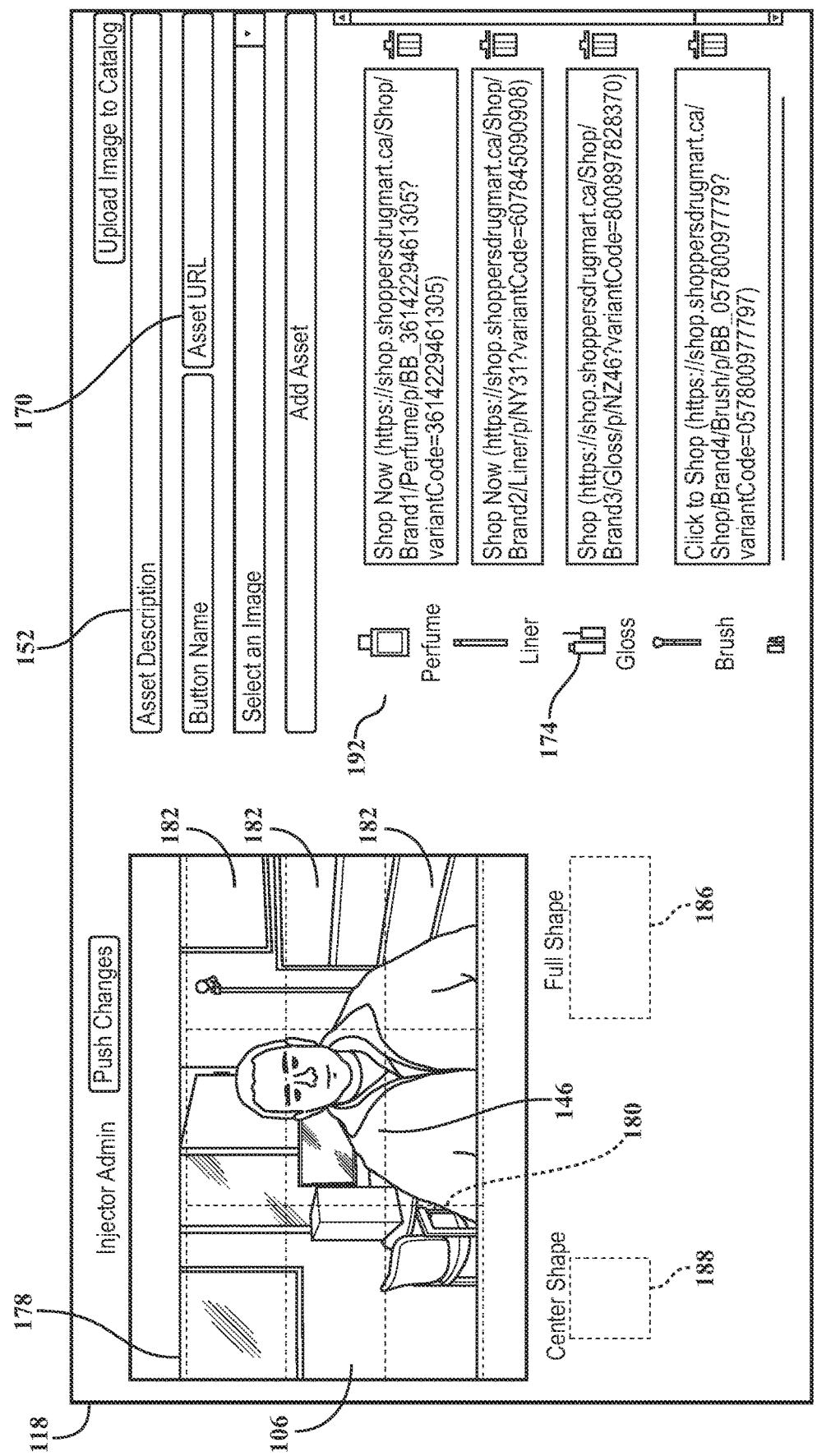
FIGS. 6-8 are schematic views of one embodiment of an injection tool according to the subject invention.
Figure 7:
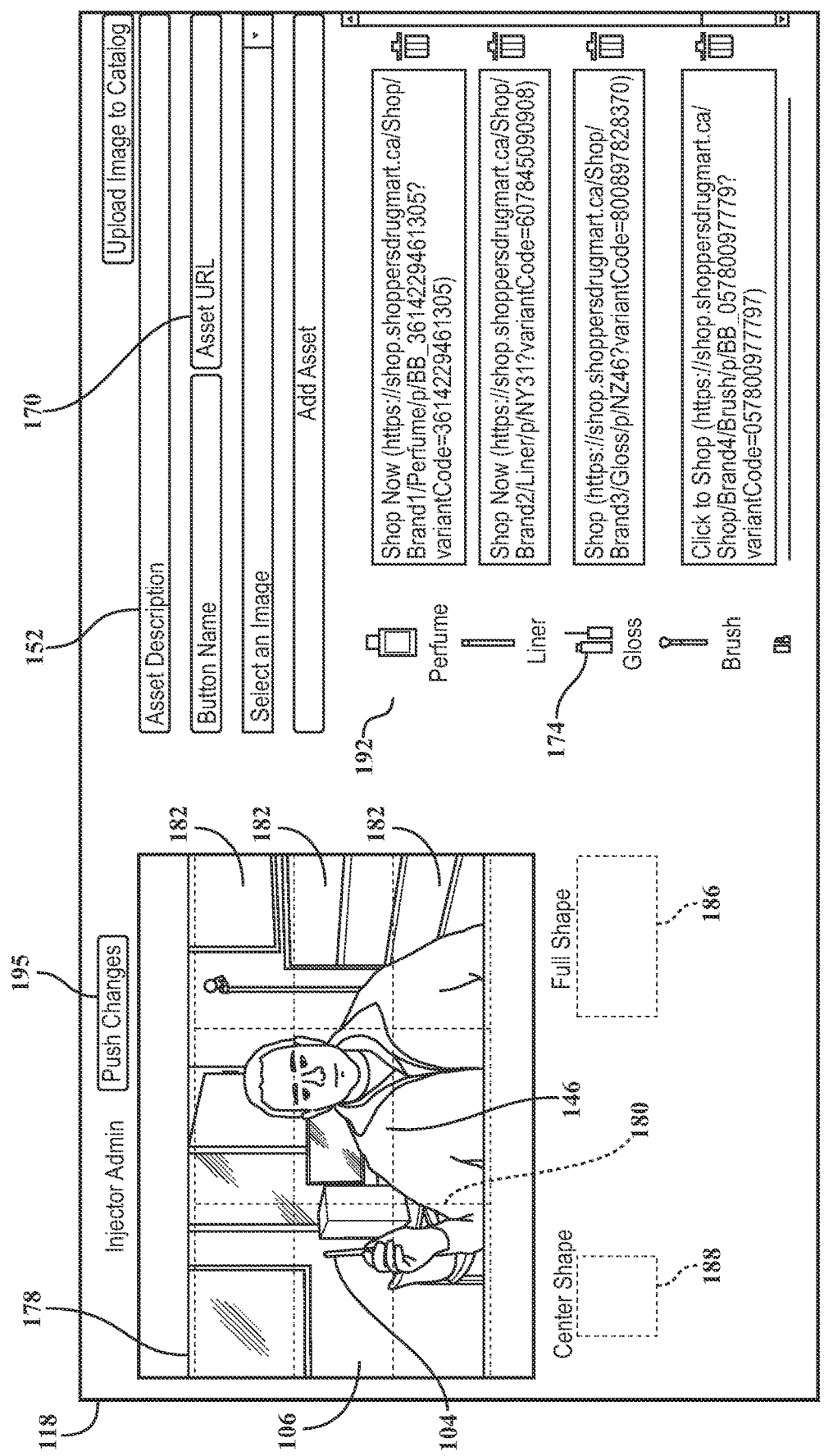
Figure 8:
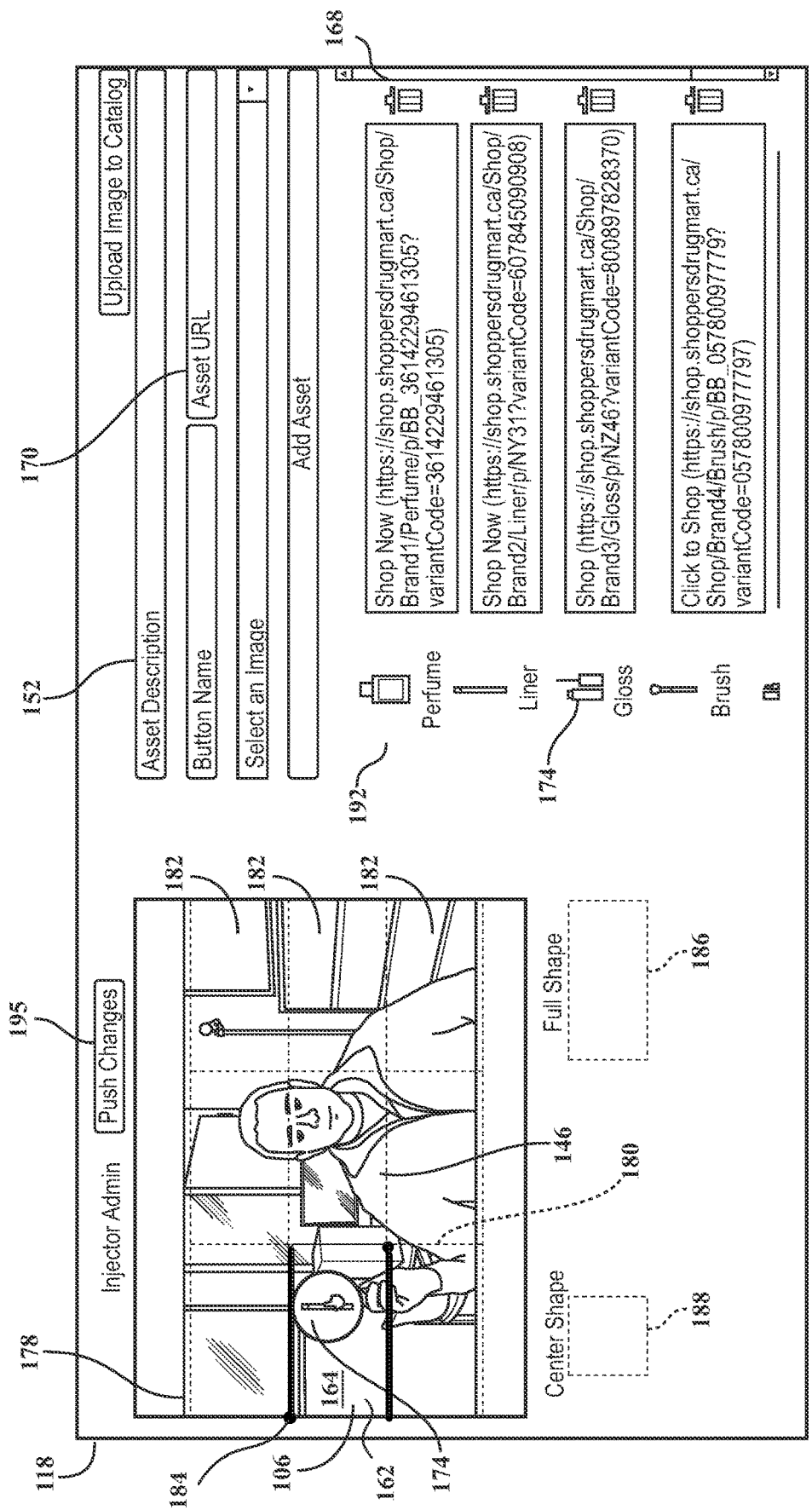
Figure 16:
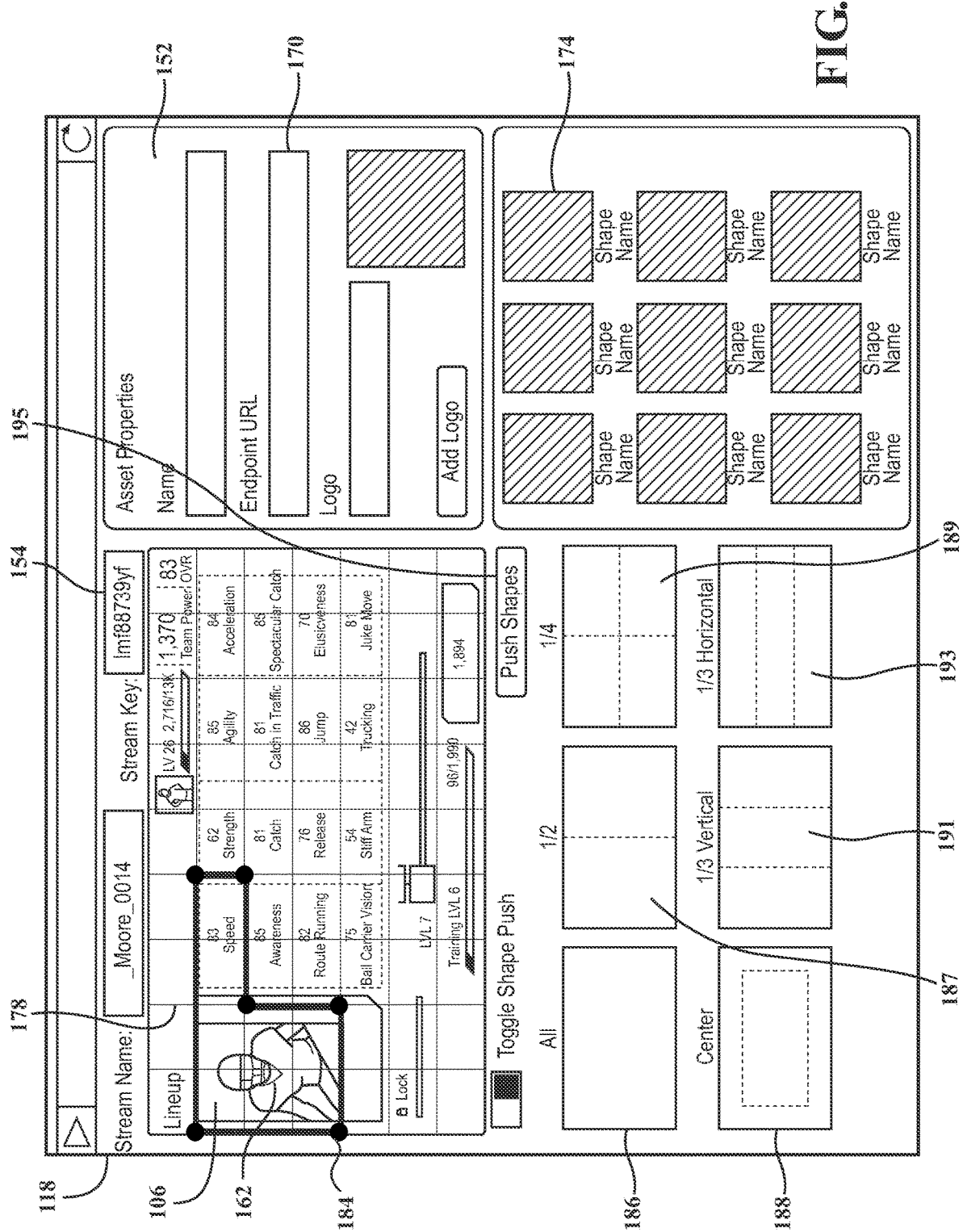
FIG. 16 is a schematic view of another embodiment of an injection tool according to the subject invention.

Referring now to creating interactivity during the live event 108 and contemporaneously with capturing the live video content 106, the subject invention uses the injection tool 118 to receive the live video content 106, as shown in FIGS. 6-8. The injection tool 118 may be operating on the same computing device 120 that is receiving the live video content 106 from the video capture system 112. The injection tool 118 may also be the same as or similar to the authoring tool 114 used to create the interactive elements 102 based on live element parameters. When more than one object 104 is visually present, and more than interactive element 102 is created, the subject invention may include first object live element parameters associated with the first element and second object live element parameters associated with the second object. This may be repeated for as many objects that appear in the media content. The injection tool 118 comprises a display 178 that shows the live video content 106 as it is being recorded and/or transmitted. The display 178 includes a grid 180 that divides the display 178 into a predetermined number of zones 182. For each of the zones 182, grid coordinates 184 are defined and the live element parameters may include the grid coordinates 184. The grid coordinates 184 are similar to the object coordinates 162 except that the grid coordinates 184 are based on the zone 182 within the grid 180. Whereas the object coordinates 162 define the precise location of the object 104, the grid coordinates 184 define the zone 182. For example, the grid 180 could divide the display 178 into four, six, eight, nine zones 182 or up to 63 zones. The grid 180 could also include the ability to select a whole area 186 of the display 178 or a center point 188 of the display 178. As shown in FIG. 1, the grid 180 comprises four zones 182. FIG. 6 shoes the grid 180 as nine zones 182 and it also includes the ability to select the whole area 186 or the center of the display 178. Referring to FIG. 16, the grid 180 is divided into halves 187, but it could also be divided into quarters 189 or thirds (vertical 191 or horizontal 193). As described above for recorded media, the object coordinates 162 could be replaced with the zone 182.

Referring back to FIG. 6, the live video content 106 is feed through the injection tool 118, such as through communication to a server or a computer making the live video content 106 visible in the injection tool 118. An operator of the injection tool 118 is able to dynamically create interactive elements 102 in the zones 182 based on what is shown in the live video content 106. For example, the injection tool 118 may include an object library 192 of possible objects 104 that are to be displayed. Specifically, the object library 192 may display the object image 174 for the objects 104 and the operator may drag and drop the object images 174 into the zone 182 to initiate the interactivity in the selected zone 182. FIG. 6 shows the object library 192 adjacent the display 178 for the operator to select the object image 174 corresponding to the object 104. The library may be stored on the database 124 or be accessible over the network 148. The operator may also input any other object metadata 168 as well, such as the URL 170 and name. Referring to FIG. 7, the actor 146 displays the object 104 in one of the zones 182. The operator selects the corresponding object image 174 from the object library 192 and drops it into the zone 182, as shown in FIG. 8. Once the object image 174 is dropped into the zone 182, a live object time is recorded. The live element parameter also may include the live object time.

The subject invention allows for one or more zones 182 to be selected with the particular object image 174. By selecting zones 182, the subject invention is able to reduce the zone down to a minimum number of points for subsequent transmitting and parsing. As one example, if one zone is selected or if multiple zones are selected that form a rectangular shape, the subject invention reduces the zones 182 to only two vertices, such as an upper left-hand corner and a lower right-hand corner. In this way, the amount of data, i.e., size, for the zone 182 is very small and can be parsed very quickly in subsequent steps. Similarly, if the shape of the zone 182 is more complex, such as a L-shape, the subject invention may reduce the zone 182 to six points that includes the outer and inner vertices. Reducing the complexity of the zones 182 that are selected is possible because the zones 182 are defined and do not move, and by reducing it to as few of vertices as possible, avoids complex computations that were encountered with prior systems. Because the subject invention utilizes the grid 180 and the selection of the zones 182, the computations can be completed much more efficiently because the shapes are based on the zones 182 that are selected in the grid 180, as opposed to free-form shapes. The subject invention achieves these efficiencies even when more than zone 182 are selected because of the simplified shapes.

The initial portable package 116 and the injection tool 118 are in communication with the package server 122. However, various other chains of communication are possible, without deviating from the scope of the invention. In operation, the injection tool 118 outputs the live element parameters to the package server 122. The live element parameters may be distributed as a package update 194. The package update 194 includes code representative of the live element parameters. The code may be any suitable format for allowing quick parsing when detected by the portable package. It is to be appreciated that the terms "update" and "file" as used herein are to be understood broadly as any digital resource for storing and transmitting information, which is available to a computer process and remains available for use after the computer process has finished. Once the object image 174 is dropped into the zone 182, the live object time is recorded and the grid coordinates 184 are associated with the object image 174, then the operator selects a push operation to create the package update 194.

The subject includes a listener 196 as part of the initial portable package 116. Once activated or executed on the viewer device within the player 142, the listener 196 calls out to the server to check for any package updates 194. The package updates 194 could be the new data or an entire new package. Depending upon the computing speed or/or the size of the package update 194, it may be most efficient to retrieve the new live element parameters and not the entire package. The subject invention may output a plurality of package updates 194 throughout the live event 108, with each package update 194 including any changes the operator has made since the prior package update. In one embodiment, the package update 194 merely replaces the initial portable package 116 and each subsequent package update 194 replaces the prior. This provides a very efficient and fast transfer of the live element parameters and parsing of the package update 194. This also allows for the distribution of the package update 194 to many viewers nearly instantaneously. Since, the package updates 194 are being generated very quickly and replacing the prior one, during the acquisition and transmission of the live event, the package updates 194 are ephemeral. Alternatively, the package updates 194 could be appended to initial portable package 116. This would continue to grow the file size of the initial portable package 116 and require slightly more time to parse than simply parsing the package update 194. In yet another embodiment, the package update 194 could be appended to the initial portable package 116 for a predetermined number of updates or for a predetermine amount of time before it is replaced. This alternative embodiment would combine benefits of both fast and efficient parsing with fewer number of updates. The initial portable package 116 as appended or the package update 194 that replaces the initial portable package 116 may be referred generally an updated portable package.

The listener 196 calls out to the server at predetermined time intervals, such as every 10 seconds. In another embodiment the calls are completed every 4-5 seconds. In yet another embodiment, the calls are completed every 3 seconds or less, and more preferably every second. Even more preferable is every 0.5 seconds. In order to provide the most up to date interactivity, the listeners 196 calls out to the server once every second. As computing and processing speed increases, these calls may occur multiple times a second. However, it is to be appreciated that the operator's ability to create the interactive elements 102 and output from the injection tool 118 may limit how often the calls need to be made. Further, a time lag may be present from capturing the live event 108 and transmitting the live video content 106 such that any delay of adding the interactivity goes unnoticed by the viewer. The listener 196 continues to monitor for package updates 194, and if there is nothing new, or no new data is received, there are no changes. If the listener 196 receives the package update 194 with new data, the initial portable package 116 is updated by replacement or appending as discussed above.

When the listener 196 detects the package update 194, the listener 196 retrieves the package update 194 and parses the live element parameters for the grid coordinates 184 and live object time 166 and adds the same to the initial shape file, which can be referred to now as a modified shape file. As the modified shape file is parsed, the zones 182 become active during display in the player 142 and the object metadata 168 becomes available if the viewer selects the zone 182. Further, the grid coordinates 184 preferably represent the fewest number of vertices that the selected zones 182 so that the package update 194 can have a relatively small file size and be able to be parsed very quickly and efficiently. The modified shape file resides within the initial portable package 116 on the viewer device 110, if appended, and hence the initial portable package 116 is now modified. As discussed above, the initial portable package 116 may be replaced with the package update 116.

Figure 9:
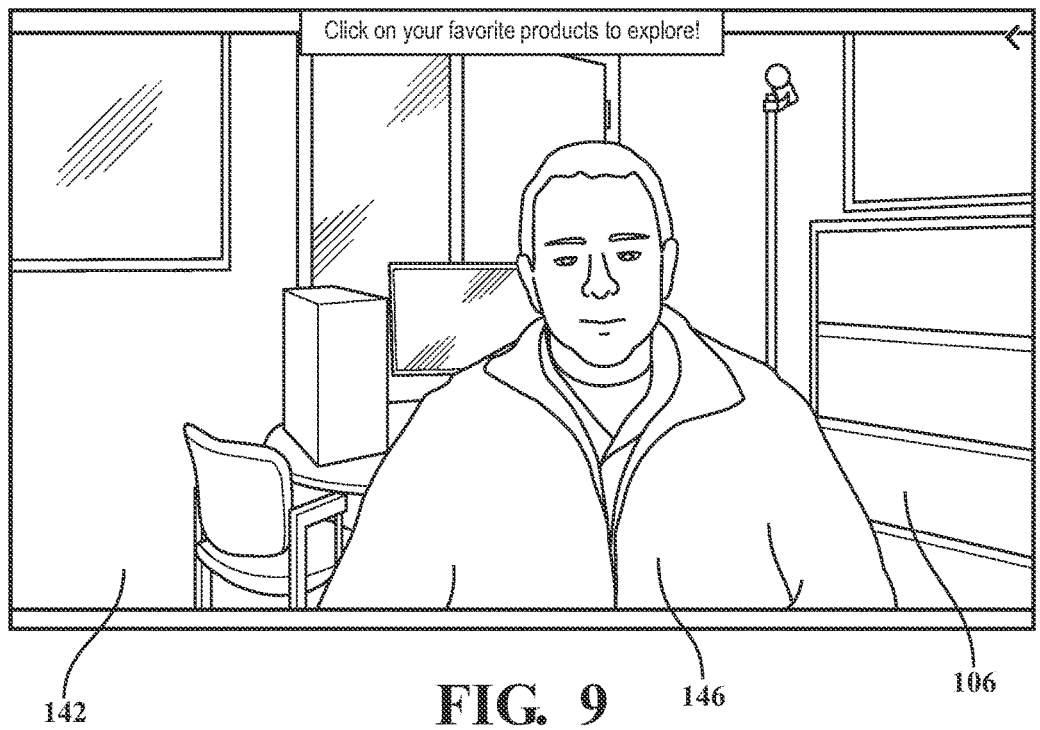
FIGS. 9-10 are schematic views of another embodiment of a player.
Figure 10:
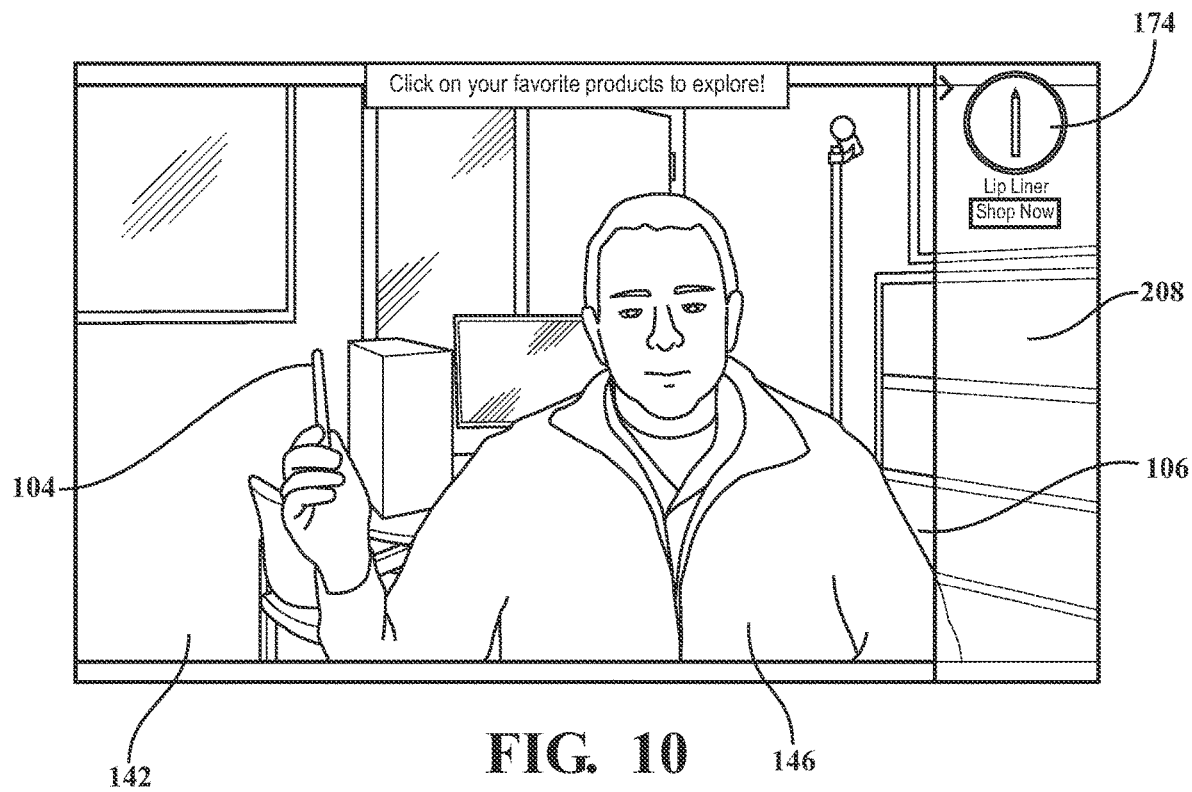

FIG. 9-10 are examples of the player 142 on the viewer device 110 with the listener 196 that has retrieved the package update 194. In FIG. 9, the player 142 displays the live event 108 and in FIG. 10, the actor 146 displays the object 104. When the viewer clicks over the object 104, which selects the zone 182 in the grid 180 associated with the object image 174, a bookmark bar 208 extends from the side of the player 142 showing the assets 152 associated with the object 104. It is to be appreciated that the assets 152 could be displayed in various other ways without departing from the subject invention.

Figure 11:
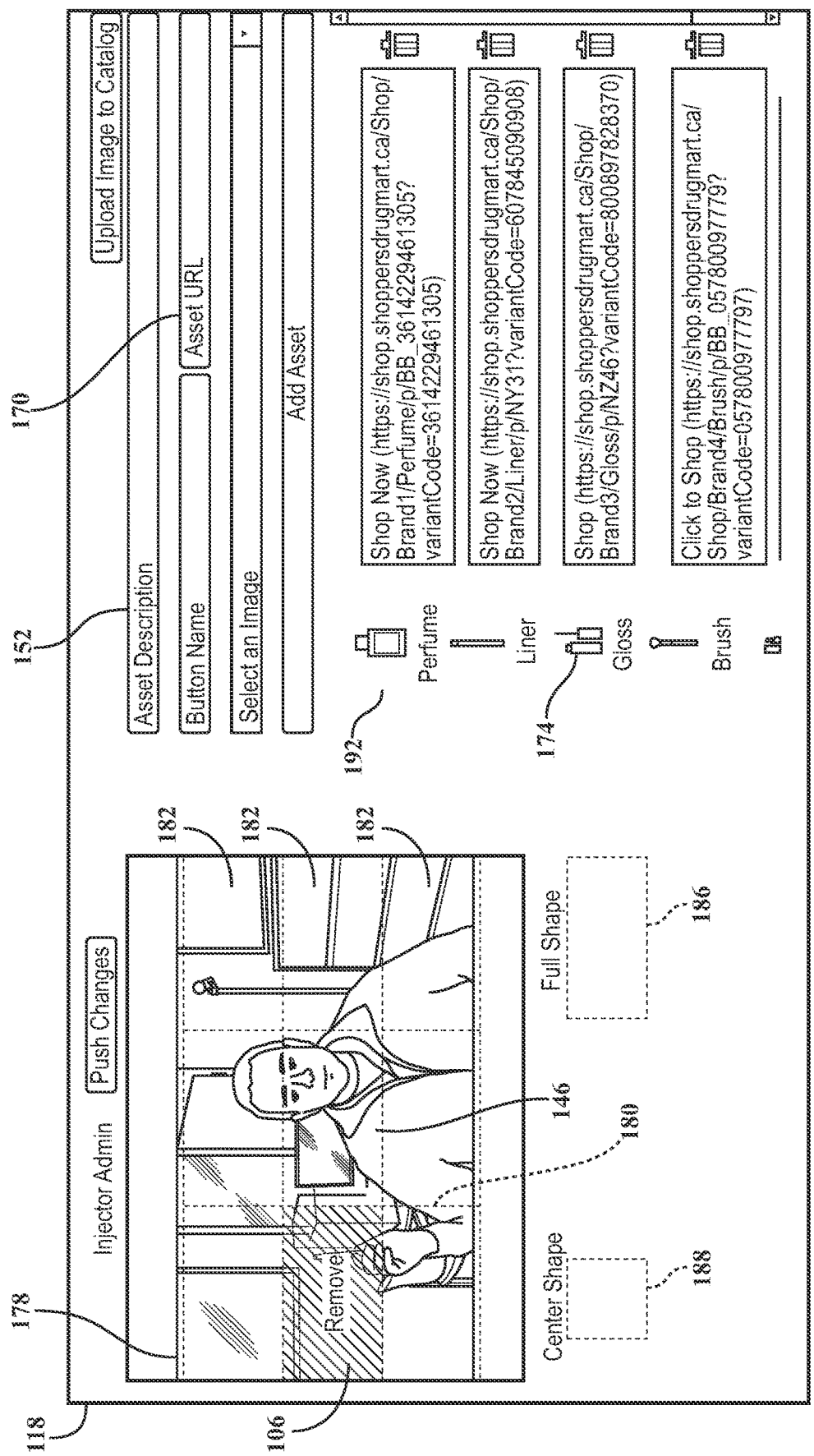
FIGS. 11-13 are schematic views of the injection tool.

Referring to FIG. 11, in the injection tool, the operator selects the zone 182 or the object image 174 to remove it when the actor 146 removes the object 104 from the scene. As one example, the operator may drag the object image 174 away from the zone 182 or, in another example, click remove, which ends the interactivity. Relative to the next package update 194, the grid coordinates 184 that represented the selected zones 182 would no longer be present, such that when the package update 194 is parsed, the interactivity for the object 104 is disabled or removed. The stop time or end time is output as part of the element parameter. It is to be appreciated that the stop time may be included as part of the live element parameter with the package update 194, however, it may not be necessary. For recorded portable packages, when the zone 182 is deselected, the live object time is stopped. The listener 196 detects the another package update 194, retrieves the another package update 194, and parses the data and adds the data into the modified shape file. As the modified shape file is further parsed, the zone 182 becomes inactive for the object 104 that was removed. If a different object 104 was added to that zone 182, then the zone 182 becomes selectable for the different object 104. When these steps are performed, the live element parameters are created. The live element parameters include at least the grid coordinates 184 (or the zone 182). The live element parameters may also include the live object time. The injection tool 118 outputs the live parameters at predetermined intervals or time and includes the live element parameters that are available at that time. The predetermined intervals or time could be the same that the listener 196 makes the calls, such as every 4-5 seconds or every 3 seconds or less, and more preferably every second to every 0.5 seconds. In the example shown, the operator then selects push, such as a through a push button 195, to create the package update 194.

Figure 12:
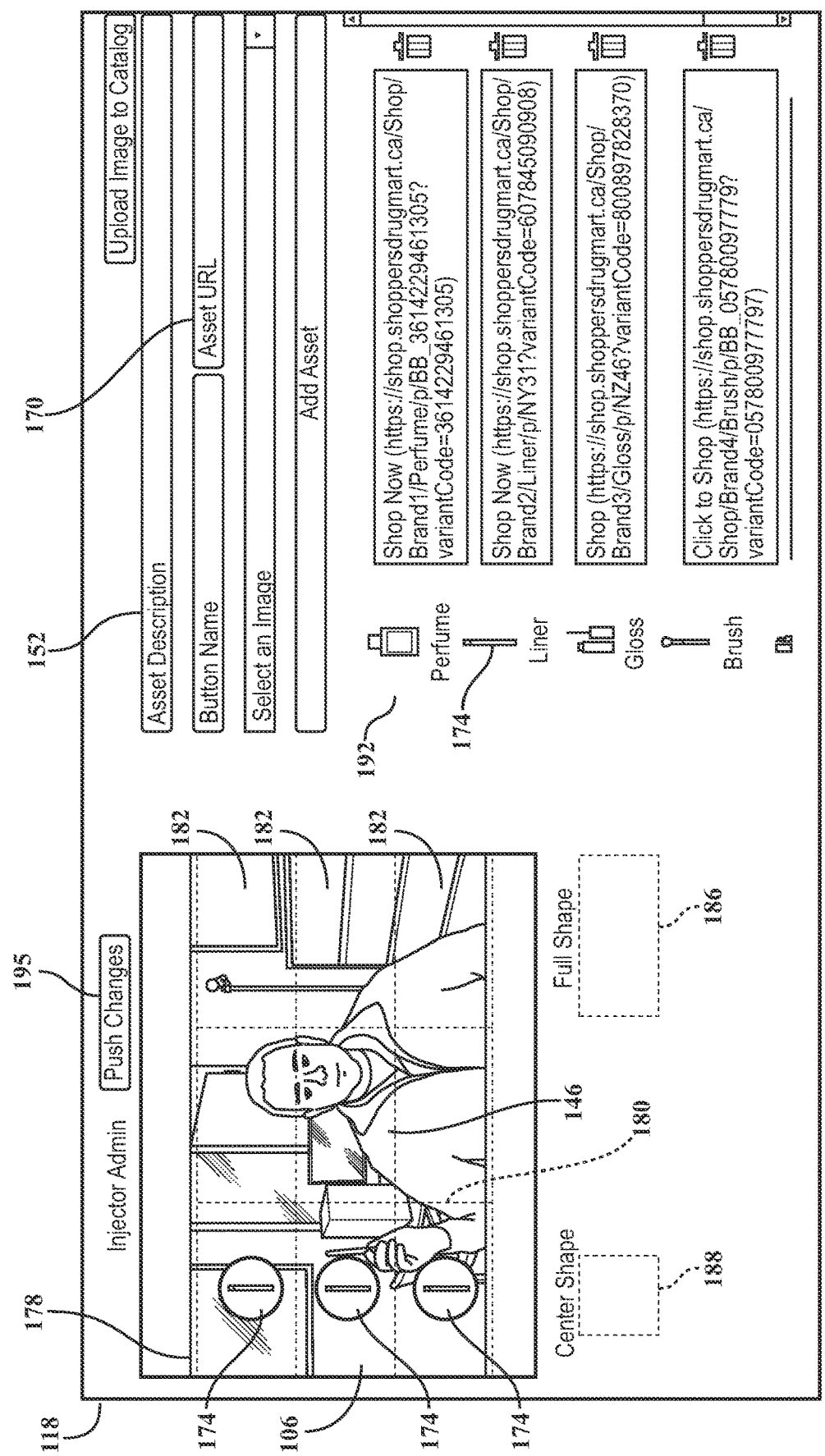
Figure 13:
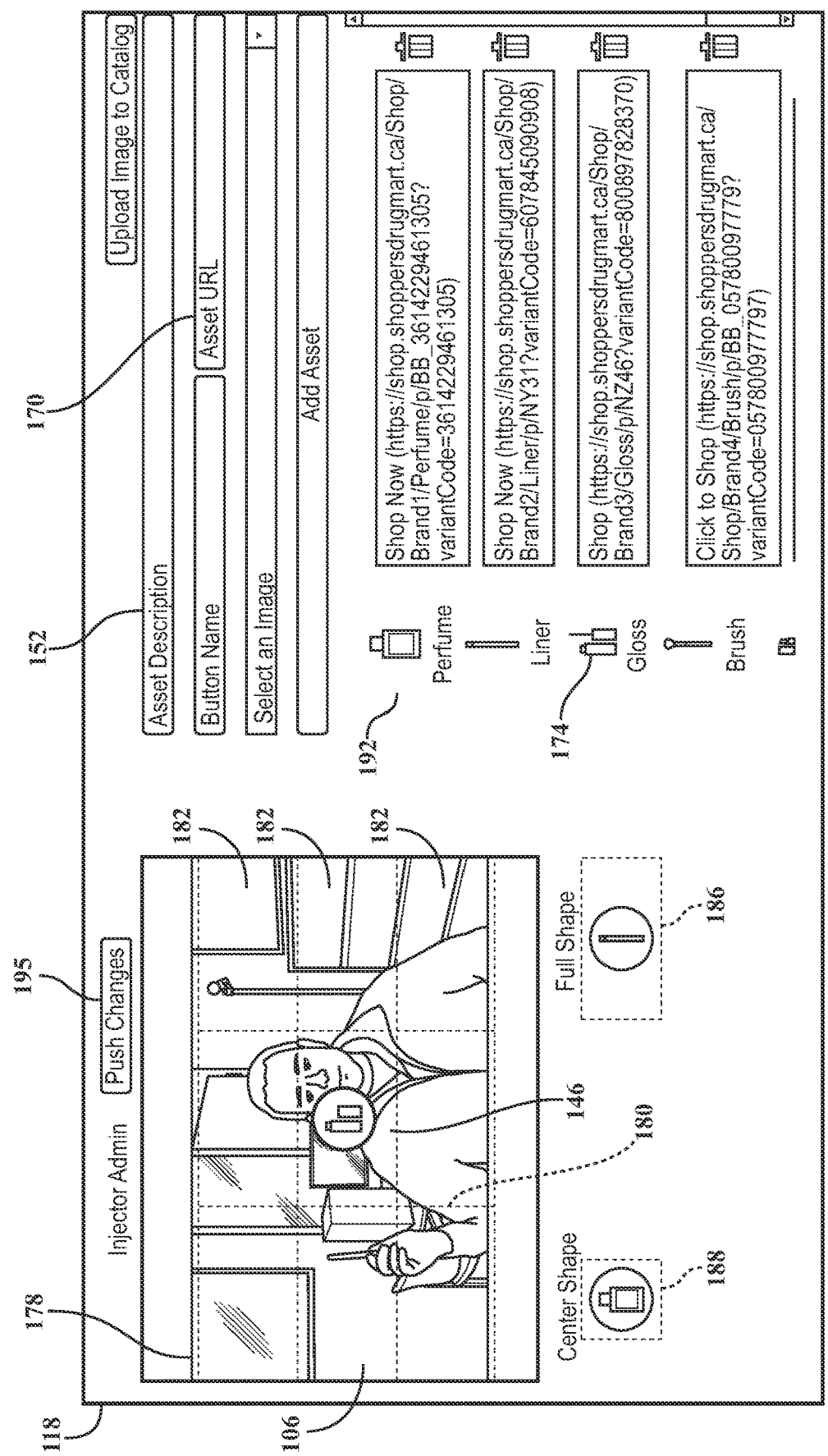
Figure 14:
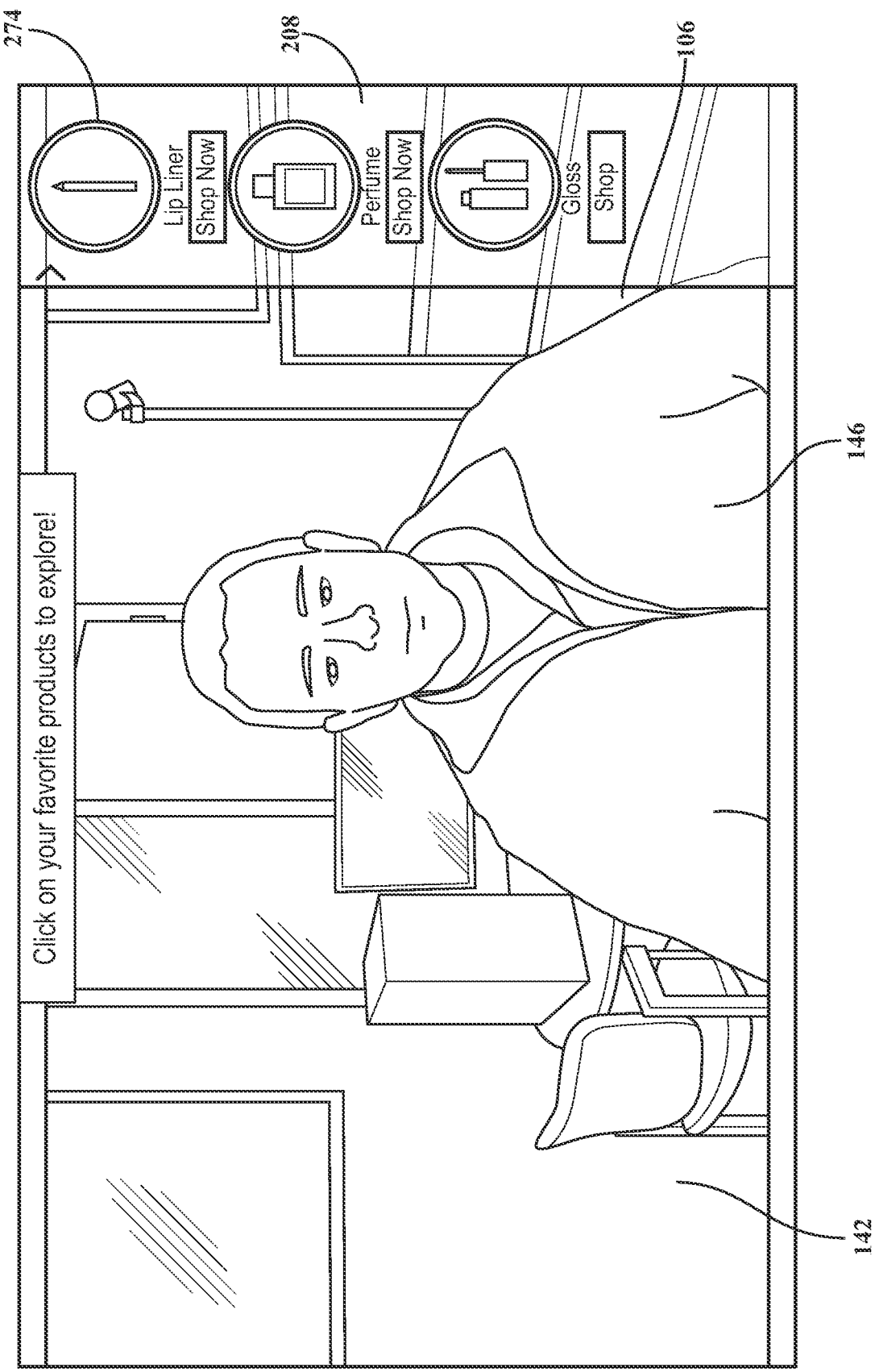
FIG. 14 is a schematic view of the player.

Referring to FIG. 12, the operator has loaded the object image 174 into three adjacent zones 182, so that if the viewer selects any of the zones 182, the object 104 is displayed. This also accounts for any inaccuracies of the actor 146 displaying the object 104 precisely in one of the zones 182. FIG. 13 shows the injection tool 118 with the operator loading one object image 174 in the center zone 182, one in a center 188 of the screen, and one on the full screen 186. In FIG. 14, if the viewer selects the center, then all three objects 104 are displayed in the bookmark bar 208. Thus, more than object 104 may be retrieved if the viewer selects zones that are assigned to different objects 104.

The initial portable package 116 stored on the package server 122 may be referred to as a server portable package, and the server portable package may contemporaneously receive the output from the injection tool 118 to update the initial shape file to match what is occurring on the viewer device 110. Alternatively, the server portable package could be updated or replaced after the conclusion of the live event 108 with the recorded portable package.

When the live event 108 ends, there are no more live element parameters that need to be created. At this stage, the plurality of package updates 194 that have been added to the modified shape file include all of the relevant grid coordinates 184 and live object time 166 and any associated metadata for objects 104 that were displayed during the live event 108. The server portable package is then saved as a final portable package (or recorded portable package) and linked with a recording of the live video content 106 for future playback. The status key may then be changed from the live content key 154 to a recorded content key. For future playback, when the player 142 detects the recorded content key, then a recorded video content is retrieved that is recorded from the live event 108.

The subject invention is able to create interactive elements 102 in real-time with the distribution of live video content 106 that does not require pre-recorded video. Further, the subject invention provides interactivity for recorded video that was transmitted as live-streamed video content based on what was displayed during the live event 108.

The subject invention is particularly useful when recorded video content is not available to create the initial portable package 116 or when it is likely that the live video content 106 might become unsynchronized from the recorded video content. For example, when live video content 106 will be longer than 10 minutes, it is difficult for talent to precisely perform the same way each and every time. When the talent does not perform the same as in the recorded video content, then there would be errors between interactivity and objects 104 not being displayed and either objects 104 would be displayed and there would be no interactivity or interactivity is present when no object 104 is displayed. If the object 104 is moving, then the interactive element 102 may not be located where the object 104 is displayed. These types of disjointed errors are likely to occur when the live feed exceeds 30 minutes or more. Therefore, the subject invention provides a way to create interactive elements 102 dynamically and in real time when the live video content 106 is created and distributed simultaneously.

The subject invention also allows the operator to create new objects 104 that are stored in the object library 192 that the injection tool 118 may access. When creating new objects 104, the injection tool 118 operates in a similar manner as the authoring tool 114 described in U.S. Pat. No. 10,477,287 and U.S. Patent Application Publication No. 2014/0047483, which are incorporated herein by reference. The operator would define the interactive elements 102 and any necessary assets 152, which would then be part of the package update 194. The listener 196 would then retrieve the object time 166, shape 164, and the other assets 152 as necessary.

For playback in the player 142, once the live video content 106 begins to play, it has a live time clock. If the player 142 retrieves the live video content 106 at the beginning then the live time clock begins at time zero. If the player 142 joins the live video content 106 after it has begun, then the live time clock is adjusted to an actual time. The subject invention may also include a recorded time clock with the initial portable package 116. The recorded time clock synchronizes with the start of the live time at time zero. When the package updates 194 are output, the object time 166 is based on the live time clock. For any recorded playback of the live event 108, the final portable package (or recorded portable package) has the recorded time clock and object time 166 synchronized.

In order to ensure interactivity, if necessary, when the initial portable package 116 is deployed, the coordinate information has to be consistent for different types and sizes of media content, different orientations of viewer devices 110, which will depend on the viewer device 110. However, after the live video content 106 is transmitted, the modified and final portable package has to ensure the object 104 and grid coordinates 184 are consistent for any type of device that access the live or recorded video content. One such method to achieve this is disclosed in U.S. Pat. No. 10,477,287, which is incorporated herein by reference.

Referring back to FIG. 2, localization determines the location of the viewer device 110 based on an IP address, delivers appropriate interface language, and records appropriate date/time/location as part of analytics. Scheduled jobs may include basic database housekeeping and analytics updates. The notification services generate response messages for completed jobs, completed uploads/encodes, etc. Media processing is a video data processing engine that supports multiple output streams to support various different platforms. Reporting is principally associated with an analytics reporting engine and management reporting engine. The web services are service handlers designed to support API connectivity to external systems. Standard web services are designed to support web based interfaces. Geo-detection refers to detection engines designed to report general location for a requesting user in order to enable localization and appropriate analytical data reporting. Event Analyzer creates events used in the portable package for appropriate response to requesting/responding user inputs, i.e. what happens when someone clicks on or off of the object 104.

The package creation process creates object mapping for the portable package and is used in conjunction with selection events to provide appropriate responses when requesting/responding when the viewer makes a selection. The item recognition process (or artificial intelligence or predictive coding) creates shapes based on object recognition.

The method may further include the step of tracking viewer preferences based upon collected data. The method may be utilized to monitor viewer behavior or habits. The collected data may be analyzed for monitoring which viewer was viewing and for how long the viewer viewed the object 104 or the media content. The collected data may be referenced for a variety of purposes. For instance, the element parameters may be updated with the additional information that is specifically tailored to the behavior or habits of the viewer determined through analysis of the collected data related to the viewer's past selection events. The data related to the object 104 selected may include what object 104 was selected, when an object 104 is selected, and how many times an object 104 is selected. The method may employ any suitable technique for collecting such data. For example, the method may analyze the database 124 and extract data related to element parameters, additional information linked to element parameters, and recorded selection events made in relation to particular element parameters.

The subject invention also utilizes an interceptor 212 that overlies the player 142. In operation, the viewer clicks in the player 142 where the object 104 is in the live video content 106. When the viewer clicks, a selection event is registered in the interceptor 212. The selection event includes selection coordinates and selection time of the click or selection event, collectively referred to as selection parameters. The interceptor 212 may not be visible to the user. The interceptor 212 is a clear applet or layer that detects the selection event from the viewer. In most standard players, when the viewer clicks, the media content starts or stops. The interceptor 212 intercepts and/or traps the selection parameters for further processing. The interceptor 212 may also display standard start, stop, pause or other playback commands so that the viewer may interact more traditionally with the live video content 106. More often, if the viewer moves the input to a specific area of the player 142, such as near one side, top, or bottom, traditional controls or menus for the player 142 become active. The selection event may be defined as a software-based event whereby the viewer appears to select the object 104 in the live video content 106. The player 142 that displays the live video content 106 to the viewer may employ various forms of allowing the viewer to select the object 104. For example, the selection event may be further defined as a click event, a touch event, voice event or any other suitable event representing the viewer's intent to select the object 104. The selection event may be registered according to any suitable technique.

In response to the selection event being detected, the portable package 116 is accessed or parsed. The portable package 116 may be local to the viewer or located on a viewer application server. In one embodiment, the portable package 116 is processed to determine if the selection event corresponds with any interactive element. The portable package 116 is parsed for any element parameters that have the object time 166 that includes the selection time that was logged during the click or selection event. If corresponding times are discovered, the selection coordinates 162 of the logged click or event is compared to the object coordinates 162 or grid coordinates 184 to determine if the logged click or selection event information is located inside or outside of the element parameter information. It is to be appreciated that one of ordinary skill could first examine the coordinates 162 and then the time to determine if the object 104 is present at the selection event. Another method of determining if the selection event was within the selected zone 182 is by determining if the number boundaries are even or odd. One such method of making the determination of the location of the click is disclosed in U.S. Pat. No. 10,477,287, which is incorporated herein by reference.

During playback in the player 142, an icon 274 may be disposed in the player 142 to indicate to the viewer that interactive elements 102 are available to be selected. The viewer may use any inputs or controls to select either one of the icons 274 or the interactive elements 102.

The additional information for the object 104 may become viewable to the viewer according to any suitable manner Once the interactive element 102 is selected, the media content may be stopped and the information may then be displayed or the media content may continue to play while the information is displayed. In either scenario, the information may be displayed in any one of the player 142 and a window separate from the player 142. As another example, a bookmark bar 208 may expand from one of the sides, top, or bottom of the player 142 showing the object 104 that has been clicked. The bookmark bar 208 may keep objects 104 previously clicked or the previously clicked objects 104 may be removed once they are no longer in the live video content 106.

Figure 15:
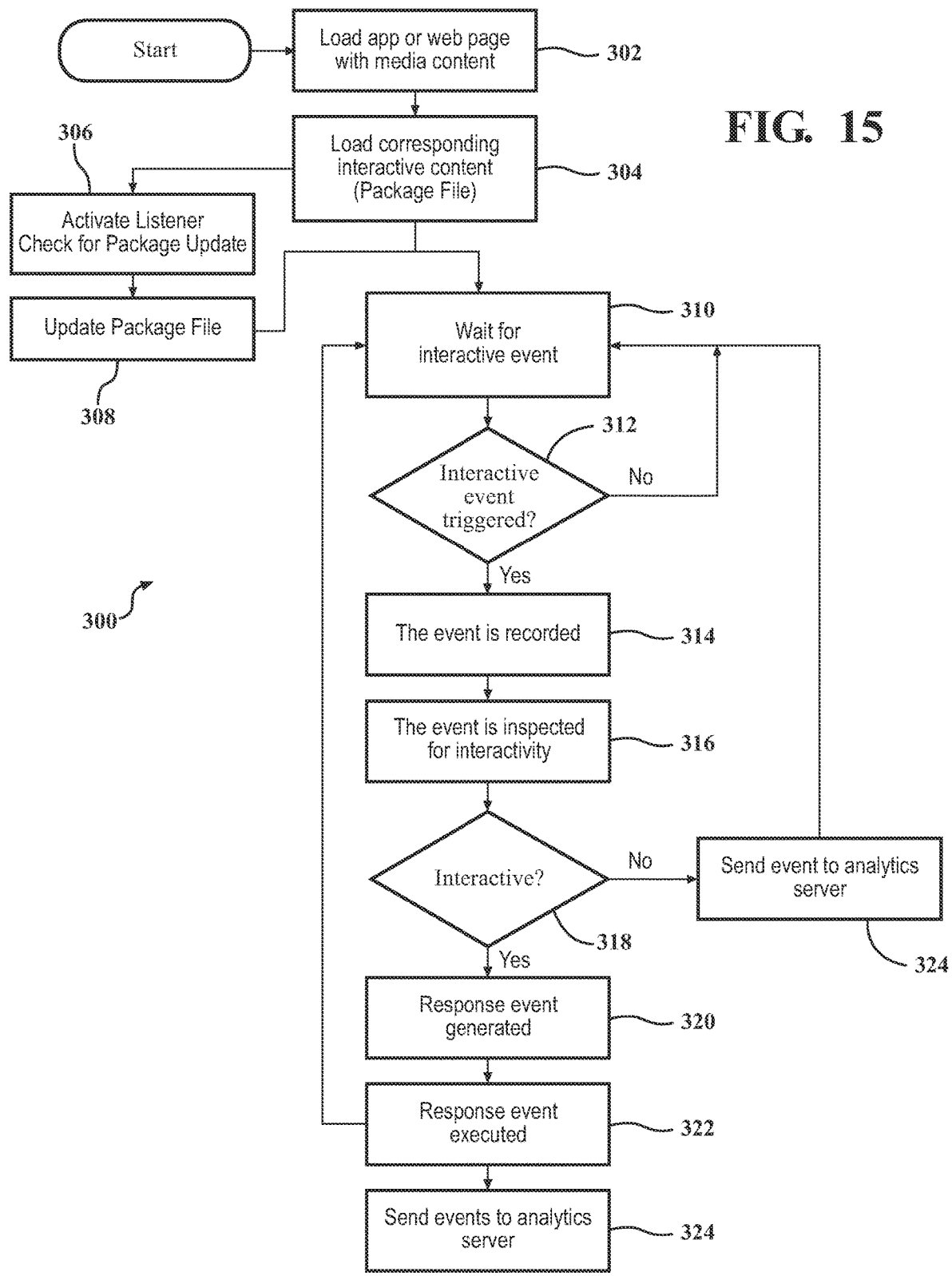
FIG. 15 is a flow chart of one embodiment for accessing media content with interactivity from the viewer device.

Referring to FIG. 15, one example of a method 300 according to the subject invention is shown. In step 302, the player 142 on the viewer device 110 is loaded and in step 304, the portable package 116 is loaded, which may be execution of the code as known by those skilled in the art. Next, the listener 196 is activated and looks for package update 194 in step 306. If package updates 194 are available, the listener 196 updates the shape file in the portable package 116, in step 308. Contemporaneously, in step 310, the listener 196 is waiting for an interactive event, such as the selection event. When detected, in Step 312, the selection event is then recorded in step 314 and then inspected for interactivity in step 316. The selection event parameters may be compared to the live object parameters and recorded object parameters if present, utilizing any suitable means of comparison, in step 318. For example, a comparison program may be used for comparing the received selection event parameters to the contents of the initial, modified, or final shape file having the parameters encoded therein. If the logged click or selection event is located inside of the shape 164, as in step 320, the corresponding object information events are processed in step 322. These include calling more assets 152 for display, pause the video playback, redirect events, etc. If no corresponding object information is found, nothing is processed. In all cases, the logged click or selection event, along with any resulting event information, are accumulated and eventually passed back for analytics processing, in step 324. The analytics can be provided to an appropriate third party or the package server 122 as needed.

The subject invention also relieves the actor 146 from having to practice or pre-record the media content. Any objects 104 that the actor 146 intends to show during the live video content 106 is loaded into the injection tool 118. Then, as the actor 146 shows various objects 104, the operator can drag the objects 104 into the respective zone 182 of the grid 180 to activate that grid 180 and associated it with that grid coordinates 184. As discussed above, the injection tool 118 outputs the data in the package update 194 and the listener 196 sees the package updates 194 and puts the interactive element 102 in the zone 182. When the object 104 is removed from the live video content 106, the operator removes the object 104 from the zone 182. The injection tool 118 outputs the data and the listener 196 remove the interactivity for that zone 182 and that object 104.

Below is one example of XML code that could be present in the shape file for different shapes. It is to be appreciated that the XML code would be compiled as machine readable code that would be used with the subject invention. In the below, this represents the package update with the time of injection being the start time, 0 seconds, and continuing until the next injection. There are 4 assets in this package update, two AssetID 1 and AssetID 2 and AssetID 3. The two AssetID 1 are rectangularly shaped as indicated by the width and height, and are located in different grids in the display.

```
<root>
    <! -- INJECTION -->
        <Resolution>720x450</Resolution>
        <! -- scale 1 resolution -->
        <newShape>
            <userID>user@user.com</userID>
            <! -- User Account -->
            <assetId>1</assetId>
            <shapeIndex>5</shapeIndex>
            <shapeType>Custom</shapeType>
            <shapeName>Microsoft Surface Book 3</shapeName>
            <shapeURL>https://www.bestbuy.com/site/microsoft-surface-book-3-15-touch-screen-
pixelsense-2-in-1-laptop-intel-core-i7-16gb-memory-256gb-ssd-
platinum/6408380.p?skuId=6408380</shapeURL>
```

```xml
            <LogoFile>user@user.com/logos/Surafce         laptop   3-
e29466357c05d17aa4dffec226efeec9.jpeg</LogoFile>
            <shapeDescription>Microsoft Surface Book 3</shapeDescription>
            <shapeLogoUrl>user@user.com/logos/Surafce     laptop   3-
e29466357c05d17aa4dffec226efeec9.jpeg</shapeLogoUrl>
            <ButtonName>Shop Now</ButtonName>
            <coordinates>
                <xStartPoint>0</xStartPoint>
                <yStartPoint>0</yStartPoint>
            </coordinates>
            <multiPoint>
                <point>
                    <xVal>426</xVal>
                    <yVal>180</yVal>
                </point>
                <point>
                    <xVal>426</xVal>
                    <yVal>300</yVal>
                </point>
                <point>
                    <xVal>639</xVal>
                    <yVal>300</yVal>
                </point>
                <point>
                    <xVal>639</xVal>
                    <yVal>180</yVal>
                </point>
            </multiPoint>
            <dimensions>
                <widthShape>213</widthShape>
                <heightShape>120</heightShape>
            </dimensions>
            <newPosition />
            <newPoints />
            <times>
                <startTime>0</startTime>
                <endTime>99999</endTime>
            </times>
        </newShape>
        <newShape>
            <userID>user@user.com</userID>
            <assetId>2</assetId>
            <shapeIndex>6</shapeIndex>
            <shapeType>Custom</shapeType>
            <shapeName>Microsoft Surface Laptop 4</shapeName>
            <shapeURL>https://www.bestbuy.com/site/microsoft-surface-laptop-4-13-5-touch-screen-
amd-ryzen-5-surface-edition-8gb-memory-256gb-ssd-latest-model-
platinum/6455189.p?skuId=6455189</shapeURL>
            <LogoFile>user@user.com/logos/Surface         Pro-
e29466357c05d17aa4dffec226efeec9.jpeg</LogoFile>
            <shapeDescription>Microsoft Surface Laptop 4</shapeDescription>
            <shapeLogoUrl>user@user.com/logos/Surface     Pro-
e29466357c05d17aa4dffec226efeec9.jpeg</shapeLogoUrl>
            <ButtonName>Shop Now</ButtonName>
            <coordinates>
                <xStartPoint>0</xStartPoint>
                <yStartPoint>0</yStartPoint>
            </coordinates>
            <multiPoint>
                <point>
                    <xVal>0</xVal>
                    <yVal>300</yVal>
                </point>
                <point>
                    <xVal>0</xVal>
                    <yVal>420</yVal>
                </point>
                <point>
                    <xVal>213</xVal>
                    <yVal>420</yVal>
                </point>
                <point>
                    <xVal>213</xVal>
                    <yVal>300</yVal>
                </point>
            </multiPoint>
            <dimensions>
                <widthShape>213</widthShape>
                <heightShape>120</heightShape>
```

```xml
        </dimensions>
        <newPosition />
        <newPoints />
        <times>
            <startTime>0</startTime>
            <endTime>99999</endTime>
        </times>
    </newShape>
    <newShape>
        <userID>user@user.com</userID>
        <assetId>3</assetId>
        <shapeIndex>7</shapeIndex>
        <shapeType>Custom</shapeType>
        <shapeName>Microsoft Surface Laptop Go</shapeName>
        <shapeURL>https://www.bestbuy.com/site/microsoft-surface-laptop-go-12-4-touch-screen-intel-10th-generation-core-i5-4gb-memory-64gb-emmc-platinum/6428991.p?skuId=6428991</shapeURL>
        <LogoFile>user@user.com/logos/Surface Go 2-e294b6357c05d17aa4dffec226efeec9.jpeg</LogoFile>
        <shapeDescription>Microsoft Surface Laptop Go</shapeDescription>
        <shapeLogoUrl>user@user.com/logos/Surface Go 2-e294b6357c05d17aa4dffec226efeec9.jpeg</shapeLogoUrl>
        <ButtonName>Shop Now</ButtonName>
        <coordinates>
            <xStartPoint>0</xStartPoint>
            <yStartPoint>0</yStartPoint>
        </coordinates>
        <multiPoint>
            <point>
                <xVal>213</xVal>
                <yVal>300</yVal>
            </point>
            <point>
                <xVal>213</xVal>
                <yVal>420</yVal>
            </point>
            <point>
                <xVal>426</xVal>
                <yVal>420</yVal>
            </point>
            <point>
                <xVal>426</xVal>
                <yVal>300</yVal>
            </point>
        </multiPoint>
        <dimensions>
            <widthShape>213</widthShape>
            <heightShape>120</heightShape>
        </dimensions>
        <newPosition />
        <newPoints />
        <times>
            <startTime>0</startTime>
            <endTime>99999</endTime>
        </times>
    </newShape>
    <newShape>
        <userID>user@user.com</userID>
        <assetId>1</assetId>
        <shapeIndex>8</shapeIndex>
        <shapeType>Custom</shapeType>
        <shapeName>Microsoft Surface Book 3</shapeName>
        <shapeURL>https://www.bestbuy.com/site/microsoft-surface-book-3-15-touch-screen-pixelsense-2-in-1-laptop-intel-core-i7-16gb-memory-256gb-ssd-platinum/6408380.p?skuId=6408380</shapeURL>
        <LogoFile>user@user.com/logos/Surafce laptop 3-e294b6357c05d17aa4dffec226efeec9.jpeg</LogoFile>
        <shapeDescription>Microsoft Surface Book 3</shapeDescription>
        <shapeLogoUrl>user@user.com/logos/Surafce laptop 3-e294b6357c05d17aa4dffec226efeec9.jpeg</shapeLogoUrl>
        <ButtonName>Shop Now</ButtonName>
        <coordinates>
            <xStartPoint>0</xStartPoint>
            <yStartPoint>0</yStartPoint>
        </coordinates>
        <multiPoint>
            <point>
                <xVal>426</xVal>
                <yVal>300</yVal>
```

-continued

```
            </point>
            <point>
                <xVal>426</xVal>
                <yVal>420</yVal>
            </point>
            <point>
                <xVal>639</xVal>
                <yVal>420</yVal>
            </point>
            <point>
                <xVal>639</xVal>
                <yVal>300</yVal>
            </point>
        </multiPoint>
        <dimensions>
            <widthShape>213</widthShape>
            <heightShape>120</heightShape>
        </dimensions>
        <newPosition />
        <newPoints />
        <times>
            <startTime>0</startTime>
            <endTime>99999</endTime>
        </times>
    </newShape>
</root>
```

When the above is part of the recorded package content, as opposed to the package update, the XML code is reflected below with a start time that is synchronized to the recorded media clock. Further, those AssetID that have the same start time were included in the same package update.

```
<newShape>
    <userID>user@user.com</userID>
    <assetId>1</assetId>
    <shapeIndex>5</shapeIndex>
    <shapeType>Custom</shapeType>
    <shapeName>Microsoft Surface Book 3</shapeName>
    <shapeURL>https://www.bestbuy.com/site/microsoft-surface-book-3-15-touch-screen-pixelsense-2-in-l-laptop-intel-core-i7-16gb-memory-256gb-ssd-platinum/6408380.p?skuId=6408380</shapeURL>
    <LogoFile>user@user.com/logos/Surafce laptop 3-e294b6357c05d17aa4dffec226efeec9.jpeg</LogoFile>
    <shapeDescription>Microsoft Surface Book 3</shapeDescription>
    <shapeLogoUrl>user@user.com/logos/Surafce laptop 3-e294b6357c05d17aa4dffec226efeec9.jpeg</shapeLogoUrl>
    <ButtonName>Shop Now</ButtonName>
    <coordinates>
        <xStartPoint>0</xStartPoint>
        <yStartPoint>0</yStartPoint>
    </coordinates>
    <multiPoint>
        <point>
            <xVal>426</xVal>
            <yVal>180</yVal>
        </point>
        <point>
            <xVal>426</xVal>
            <yVal>300</yVal>
        </point>
        <point>
            <xVal>639</xVal>
            <yVal>300</yVal>
        </point>
        <point>
            <xVal>639</xVal>
            <yVal>180</yVal>
        </point>
    </multiPoint>
    <dimensions>
        <widthShape>213</widthShape>
        <heightShape>120</heightShape>
```

```xml
        </dimensions>
        <newPosition />
        <newPoints />
        <times>
            <startTime>422.46873496185304</startTime>
            <endTime>99999</endTime>
        </times>
    </newShape>
    <newShape>
        <userID>user@user.com</userID>
        <assetId>2</assetId>
        <shapeIndex>6</shapeIndex>
        <shapeType>Custom</shapeType>
        <shapeName>Microsoft Surface Laptop 4</shapeName>
        <shapeURL>https://www.bestbuy.com/site/microsoft-surface-laptop-4-13-5-touch-screen-amd-ryzen-5-surface-edition-8gb-memory-256gb-ssd-latest-model-platinum/6455189.p?skuId=6455189</shapeURL>
        <LogoFile>user@user.com/logos/Surface Pro-e29466357c05d17aa4dffec226efeec9.jpeg</LogoFile>
        <shapeDescription>Microsoft Surface Laptop 4</shapeDescription>
        <shapeLogoUrl>user@user.com/logos/Surface Pro-e29466357c05d17aa4dffec226efeec9.jpeg</shapeLogoUrl>
        <ButtonName>Shop Now</ButtonName>
        <coordinates>
            <xStartPoint>0</xStartPoint>
            <yStartPoint>0</yStartPoint>
        </coordinates>
        <multiPoint>
            <point>
                <xVal>0</xVal>
                <yVal>300</yVal>
            </point>
            <point>
                <xVal>0</xVal>
                <yVal>420</yVal>
            </point>
            <point>
                <xVal>213</xVal>
                <yVal>420</yVal>
            </point>
            <point>
                <xVal>213</xVal>
                <yVal>300</yVal>
            </point>
        </multiPoint>
        <dimensions>
            <widthShape>213</widthShape>
            <heightShape>120</heightShape>
        </dimensions>
        <newPosition />
        <newPoints />
        <times>
            <startTime>422.46873496185304</startTime>
            <endTime>99999</endTime>
        </times>
    </newShape>
    <newShape>
        <userID>user@user.com</userID>
        <assetId>3</assetId>
        <shapeIndex>7</shapeIndex>
        <shapeType>Custom</shapeType>
        <shapeName>Microsoft Surface Laptop Go</shapeName>
        <shapeURL>https://www.bestbuy.com/site/microsoft-surface-laptop-go-12-4-touch-screen-intel-10th-generation-core-i5-4gb-memory-64gb-emmc-platinum/6428991.p?skuId=6428991</shapeURL>
        <LogoFile>user@user.com/logos/Surface Go 2-e294b6357c05d17aa4dffec226efeec9.jpeg</LogoFile>
        <shapeDescription>Microsoft Surface Laptop Go</shapeDescription>
        <shapeLogoUrl>user@user.com/logos/Surface Go 2-e294b6357c05d17aa4dffec226efeec9.jpeg</shapeLogoUrl>
        <ButtonName>Shop Now</ButtonName>
        <coordinates>
            <xStartPoint>0</xStartPoint>
            <yStartPoint>0</yStartPoint>
        </coordinates>
        <multiPoint>
            <point>
                <xVal>213</xVal>
                <yVal>300</yVal>
            </point>
```

```
        </point>
        <point>
          <xVal>213</xVal>
          <yVal>420</yVal>
        </point>
        <point>
          <xVal>426</xVal>
          <yVal>420</yVal>
        </point>
        <point>
          <xVal>426</xVal>
          <yVal>300</yVal>
        </point>
      </multiPoint>
      <dimensions>
        <widthShape>213</widthShape>
        <heightShape>120</heightShape>
      </dimensions>
      <newPosition />
      <newPoints />
      <times>
        <startTime>422.46873496185304</startTime>
        <endTime>99999</endTime>
      </times>
    </newShape>
    <newShape>
      <userID>user@user.com</userID>
      <assetId>1</assetId>
      <shapeIndex>8</shapeIndex>
      <shapeType>Custom</shapeType>
      <shapeName>Microsoft Surface Book 3</shapeName>
      <shapeURL>https://www.bestbuy.com/site/microsoft-surface-book-3-15-touch-screen-pixelsense-2-in-1-laptop-intel-core-i7-16gb-memory-256gb-ssd-platinum/6408380.p?skuId=26408380</shapeURL>
      <LogoFile>user@user.com/logos/Surafce          laptop     3-e294b6357c05d17aa4dffec226efeec9.jpeg</LogoFile>
      <shapeDescription>Microsoft Surface Book 3</shapeDescription>
      <shapeLogoUrl>user@user.com/logos/Surafce          laptop     3-e294b6357c05d17aa4dffec226efeec9.jpeg</shapeLogoUrl>
      <ButtonName>Shop Now</ButtonName>
      <coordinates>
        <xStartPoint>0</xStartPoint>
        <yStartPoint>0</yStartPoint>
      </coordinates>
      <multiPoint>
        <point>
          <xVal>426</xVal>
          <yVal>300</yVal>
        </point>
        <point>
          <xVal>426</xVal>
          <yVal>420</yVal>
        </point>
        <point>
          <xVal>639</xVal>
          <yVal>420</yVal>
        </point>
        <point>
          <xVal>639</xVal>
          <yVal>300</yVal>
        </point>
      </multiPoint>
      <dimensions>
        <widthShape>213</widthShape>
        <heightShape>120</heightShape>
      </dimensions>
      <newPosition />
      <newPoints />
      <times>
        <startTime>422.46873496185304</startTime>
        <endTime>99999</endTime>
      </times>
    </newShape>
  </root>
  <!-- LAST INJECTION END -->
```

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for providing additional information associated with an object visually present in live media content when interacted with by a user on a viewer device, said method comprising the steps of:
    creating an initial portable package for the live media content that includes a live media content key;
    distributing the initial portable package to be retrievable by the viewer device in response to a request from the viewer device;
    receiving a request from the viewer device for the initial portable package;
    delivering the initial portable package to the viewer device based on the request;
    acquiring live media content with a video capture system;
    displaying the live video content as the live video is acquired in an injection tool having a display and a grid dividing the display into a plurality of zones;
    dynamically creating interactivity in one or more of the plurality of zones in response to the object being visually present within the one or more of the plurality of zones and dynamically disabling the interactivity in the one or more of the plurality of zones in response the object no longer being visually present;
    wherein the step of creating the interactivity further comprises defining object images for any object that may be visually present in the live media;
    selecting one or more of the zones where the object is visually present and associating the selected zones and the object image;
    defining an object injection time in response to associating the selected zones and the object image;
    defining a live element parameter as including the object injection time and the selected zones for the object image;
    creating a package update that includes the live element parameter;
    delivering the package update to the viewer device and updating the initial portable package with the live element parameter as an updated portable package;
    receiving a selection event from within a viewer on the viewer device that comprises a selection coordinate and a selection time;
    parsing the updated portable package to determine whether the selection time corresponds to the object injection time, and if the selection time corresponds with the object injection time, further parsing the updated portable package to determine whether the selection coordinate is within the selected zones; and
    retrieving object metadata if the selection coordinate is within the selected zones such that additional information is displayable to the viewer on the viewer device.

2. A method as set forth in claim 1 wherein the step of disabling the interactivity is further defined as deselecting the zones once the object is no longer visually present and disassociating the zones and the object image creating another package update having the zones disassociated as another live element parameter, and delivering the another package update to the viewer device and updating the portable package.

3. A method as set forth in claim 2 wherein the steps of defining the live element parameter, creating the package update and delivering the package update continue as long as additional objects are introduced throughout the acquisition of the live media content.

4. A method as set forth in claim 3 wherein the package update is further defined as including only new data since the last package update for minimizing a size of the package update.

5. A method as set forth in claim 3 further comprising the step of creating a recorded portable package after the live media content has concluded that includes a recorded media content key and any package updates and distributing the recorded portable package to be retrievable by the viewer device in response to a request from the viewer device.

6. A method as set forth in claim 2 further comprising the step of defining an object stop time in response to disassociating the selected zones and the object image, and defining another live element parameter as including the object stop time, the deselected zones and the object image.

7. A method as set forth in claim 6 further comprising the step of defining a live time clock associated with a beginning of the live media content that is part of the initial portable package and providing actual time that is part of the package updates; and wherein the object injection time and the object stop time correspond to the actual time.

8. A method as set forth in claim 7 further comprising the step of synchronizing a recorded clock to the live clock so that the at least one interactive element corresponds to when the object is visually present in the live media content.

9. A method as set forth in claim 1 further comprising the step of defining an object stop time when the object image is removed and disassociated with the zone and distributing the object stop time as another package update.

10. A method as set forth in claim 1 wherein said initial portable package further comprises a listener that retrieves package updates at predetermined time intervals for updating the portable package with the live element parameter.

11. A method as set forth in claim 1 wherein the plurality of zones is further defined as having from four to sixty-three zones.

12. A method as set forth in claim 11 wherein the plurality of zones is further defined as dividing the display into halves, quarters, and/or thirds.

13. A method as set forth in claim 12 wherein the plurality of zones is further defined as including a center zone and/or a full screen zone.

14. A method as set forth in claim 1 wherein the step of creating interactivity is further defined as selecting one or more of the zones when a first object is present and selecting other zones for a second object when the first object and the second object are visually present and defining first object live element parameters and second object live element parameters that are delivered with the package update.

15. A method as set forth in claim 1 further comprising the step of defining object mapping that translates the grid to differing viewer devices for responding when the zones are selected.

16. A method as set forth in claim 1 wherein each of the zones is further defined as having grid coordinates being reduced to a minimum number of vertices to define the selected zone.

* * * * *